US012428353B2

(12) United States Patent
Guynn

(10) Patent No.: US 12,428,353 B2
(45) Date of Patent: Sep. 30, 2025

(54) CLASSIFICATION AND RECOMBINATION OF DIFFERENT SCM AND CEMENT FRACTIONS TO EFFICIENTLY MANUFACTURE CEMENT-SCM COMPOSITIONS

(71) Applicant: ROMAN CEMENT, LLC, Salt Lake City, UT (US)

(72) Inventor: John M. Guynn, Salt Lake City, UT (US)

(73) Assignee: ROMAN CEMENT, LLC, Salt Lake City, UT (US)

( * ) Notice: Subject to any disclaimer, the term of this patent is extended or adjusted under 35 U.S.C. 154(b) by 234 days.

(21) Appl. No.: 17/553,379

(22) Filed: Dec. 16, 2021

(65) Prior Publication Data

US 2022/0106235 A1    Apr. 7, 2022

Related U.S. Application Data

(63) Continuation of application No. 15/331,813, filed on Oct. 22, 2016, now abandoned.
(Continued)

(51) Int. Cl.
| C04B 40/00 | (2006.01) |
| B02C 23/08 | (2006.01) |
| C04B 28/04 | (2006.01) |
| C04B 28/10 | (2006.01) |
| C04B 28/18 | (2006.01) |

(52) U.S. Cl.
CPC .......... *C04B 40/0046* (2013.01); *B02C 23/08* (2013.01); *C04B 28/04* (2013.01); *C04B 28/10* (2013.01); *C04B 28/18* (2013.01)

(58) Field of Classification Search
CPC ......... B02C 23/08; C04B 14/22; C04B 14/26; C04B 14/28; C04B 18/08; C04B 18/141; C04B 20/0088; C04B 20/026; C04B 28/04; C04B 28/10; C04B 28/18; C04B 40/0046; C04B 7/12; Y02W 30/91
See application file for complete search history.

(56) References Cited

U.S. PATENT DOCUMENTS 7,799,128 B2    9/2010 Guynn et al.
7,972,432 B2    7/2011 Guynn et al.
(Continued)

FOREIGN PATENT DOCUMENTS

WO    WO-2011130482 A2 * 10/2011 ............. B02C 21/00

*Primary Examiner* — Shuangyi Abu Ali
(74) *Attorney, Agent, or Firm* — Workman Nydegger

(57) ABSTRACT

Methods and systems for efficiently manufacturing particulate blending materials for use in making particle size optimized cements, SCMs, blended cements and cement-SCM blends. An initial hydraulic cement or SCM having an initial particle size distribution (PSD), an initial d10, and an initial d90 is processed using one or more air classifiers, and optionally one or more mills, to yield a plurality of hydraulic cement or SCM fractions having desired particle size distributions (PSDs). The hydraulic cement fractions can be blended with SCMs to form binary and ternary cement-SCM blends. The SCM fractions can also be used to make binary and ternary blends. A surplus fine cement fraction can be used to raise the fineness and/or reactivity of a less fine and/or less reactive hydraulic cement. A surplus fine SCM can be used as a silica fume substitute.

20 Claims, 12 Drawing Sheets

Related U.S. Application Data

(60) Provisional application No. 62/244,739, filed on Oct. 21, 2015.

(56) References Cited

U.S. PATENT DOCUMENTS

| | | |
|---|---|---|
| 8,323,399 B2 | 12/2012 | Guynn et al. |
| 8,377,201 B2 | 2/2013 | Guynn et al. |
| 8,414,700 B2 | 4/2013 | Guynn et al. |
| 8,551,245 B2 | 10/2013 | Guynn et al. |
| 8,974,593 B2 | 3/2015 | Guynn et al. |
| 9,067,824 B1 | 6/2015 | Hansen et al. |
| 9,102,567 B1 | 8/2015 | Hansen et al. |
| 9,238,591 B2 | 1/2016 | Guynn et al. |
| 9,272,953 B2 | 3/2016 | Guynn et al. |
| 2012/0145046 A1* | 6/2012 | Hansen .................. G06Q 99/00 106/739 |
| 2014/0224154 A1* | 8/2014 | Guynn .................. C04B 20/026 106/638 |

\* cited by examiner

CLASSIFICATION AND RECOMBINATION OF DIFFERENT SCM AND CEMENT FRACTIONS TO EFFICIENTLY MANUFACTURE CEMENT-SCM COMPOSITIONS

CROSS-REFERENCE TO RELATED APPLICATION

This Application is a continuation of U.S. patent application Ser. No. 15/331,813, filed Oct. 22, 2016, which claims the benefit of U.S. Provisional Application No. 62/244,739, filed Oct. 21, 2015, the disclosures of which are incorporated herein in their entirety.

BACKGROUND OF THE INVENTION

1. Field of the Invention

The invention is generally in the field of hydraulic cements, supplementary cementitious materials (SCMs), blends of hydraulic cements and SCMs, and methods and apparatus for manufacturing hydraulic cements, SCMs, and cement-SCM compositions.

2. Relevant Technology

Supplementary Cementitious Materials, such as coal ash, metallurgical slags, natural pozzolans, biomass ash, post-consumer glass, and limestone, can be used to replace a portion of Portland cement in concrete. SCMs can yield improved concrete with increased paste density, higher durability, lower heat of hydration, lower chloride permeability, reduced creep, increased resistance to chemical attack, lower cost, and reduced environmental impact. Pozzolans react with calcium hydroxide released during cement hydration. Limestone can provide a filler effect and accelerate cement hydration. Some SCMs have self-cementing properties, an example of which ground granulated blast furnace slag (GGBFS).

Portland cement, sometimes referred to as "cement clinker", "ordinary Portland cement", "OPC", or "cement" is typically the costliest component of concrete. OPC manufacture is very energy intensive, requiring the burning of large amounts of fuel, which produces $CO_2$ and other pollutants as combustion byproducts. Calcining limestone (mainly calcium carbonate, or $CaCO_3$) also releases process $CO_2$ when converted into lime (calcium oxide, or CaO). In fact, the manufacture of cement clinker contributes an estimated 5-7% of all manmade $CO_2$. Despite an abundant supply of lower cost SCMs, the industry has failed to overcome technical hurdles that prevent full utilization of SCMs. A major problem is that SCMs are primarily industrial waste products that are not purposely produced for blending with OPC. Although most SCMs are reactive to various extents, they are slower reacting then OPC. Partially replacing OPC with SCMs typically reduces strength by dilution, especially early strength. Increased SCM substitution further increases strength loss by dilution.

There are essentially two commercial pathways for making blended cement—intergrinding or simple blending. In simple blending, the OPC and SCM components are produced separately and blended together without intergrinding, either by dry blending or in the presence of water when making fresh concrete. In intergrinding, cement clinker and one or more SCMs are interground in a cement mill to a specified fineness to yield the finished blended cement. Self-blending of OPC and fly ash by concrete manufactures is common in the United States while intergrinding to make finished blended cement is common in Europe, Latin America, and Asia.

BRIEF SUMMARY OF DISCLOSED EMBODIMENTS

Disclosed herein are methods and systems for efficiently manufacturing hydraulic cements and SCMs (collectively "particulate blending materials" ("PBMs") and singly "particulate blending material" ("PBM")) for use in making particle size optimized cements, SCMs, blended cements, and other cement-SCM compositions. Also disclosed are methods and systems for efficiently manufacturing particle size optimized cements, SCMs, blended cements, and other cement-SCM compositions. The methods and systems facilitate the manufacture of hydraulic cements and SCMs having non-traditional particle size distributions ("PSDs"), such as narrow PSD cements optimized for blending with one or more supplementary cementitious materials (SCMs). The methods and systems can also be used to control and optimize the PSDs of one or more SCM fractions for blending with hydraulic cement to make blended cement or other cement-SCM compositions. In particle size optimized compositions, the cement and SCM fractions can have different, such as complementary, PSDs to yield a cement-SCM composition having a broadened PSD compared to individual particulate components.

In some embodiments, a method for efficiently manufacturing particulate blending materials (PBMs) of different PSD for making particle size optimized cements, SCMs, blended cements and other cement-SCM compositions comprises: (1) processing an initial PBM selected from hydraulic cement and SCM and having an initial PSD (e.g., an initial d10 and an initial d90) in one or more air classifying steps, and optionally in one or more milling steps, to yield a plurality of PBM fractions with varying PSDs (e.g., varying d10 and/or d90); (2) collecting a first PBM fraction having a first PSD that differs from the initial PSD (e.g., a first d90 less than the initial d90); and (3) collecting a second PBM fraction having a second PSD that differs from the initial and first PSDs (e.g., a second d10 greater than the initial d10 and a second d90 greater than the first d90).

In some embodiments, a method for efficiently manufacturing cement blending materials of different PSD for making particle size optimized cements, blended cements, and other cement-SCM compositions comprises: (1) processing an initial hydraulic cement or ground clinker having an initial PSD (e.g., an initial d10 and an initial d90) in one or more air classifying steps, and optionally in one or more milling steps, to yield a plurality of cement blending fractions with varying PSDs (e.g., varying d10 and/or d90); (2) collecting a first cement blending fraction having a first PSD that differs from the initial PSD (e.g., a first d90 less than the initial d90); and (3) collecting a second cement blending fraction having a second PSD that differs from the initial PSD and the first PSD (e.g., a second d10 greater than the initial d10 and a second d90 greater than the first d90).

In some embodiments, a method for efficiently manufacturing SCM blending fractions of different PSD for making particle size optimized SCMs, blended cements, and other cement-SCM compositions comprises: (1) processing an initial SCM having an initial PSD (e.g., an initial d10 and an initial d90) in one or more air classifying steps, and optionally in one or more milling steps, to yield a plurality of SCM blending fractions with varying PSDs (e.g., varying d10 and/or d90); (2) collecting a first SCM blending fraction having a first PSD that differs from the initial PSD (e.g., a first d90 less than the initial d90); and (3) collecting a second SCM blending fraction having a second PSD that differs from the initial PSD and the first PSD (e.g., a second d10 greater than the initial d10 and a second d90 greater than the first d90).

Different particulate blending material (PBM) fractions can be combined with other PBM fractions and/or traditional OPC and/or traditional SCMs as desired to yield a desired cement, SCM, blended cement, or cement-SCM composition. In some embodiments, a fine cement (e.g., d90<25 μm) can be blended with a coarse SCM (e.g., d90>25 μm) to form a binary blend having an overall PSD broader than either the fine cement or coarse SCM individually. In other embodiments, a narrow PSD cement (e.g., d90<30 μm and d10>1.5 μm) can be blended with a fine SCM (e.g., d90<10 μm) and a coarse SCM (d10>5 μm and d90>30 μm) to form a ternary blend having an overall PSD broader than either the narrow PSD cement, fine SCM, or coarse SCM individually. Because binary and ternary blends made in this manner can have greater early strength, durability, and other beneficial properties compared to traditional blends of OPC and SCMs, dividing the cement and/or SCM materials into multiple blending fractions of different PSD and the blending them so that the cement and SCM fractions complement each other can yield two or more cement-SCM compositions having superior properties than traditional blended cements. The ratios of the different particulate blending materials can be altered to yield blends having a wide variety of cement substitution levels, strengths, durabilities, and the like.

In some embodiments, a method for efficiently manufacturing a particle size optimized cement-SCM composition comprises: (1) obtaining a fine cement fraction having a d90 less than a d90 of specified value; (2) obtaining a coarse SCM fraction having a d90 greater than the specified value; and (3) blending the fine cement and coarse SCM fractions to form a cement-SCM composition. In some embodiments, a narrow PSD cement fraction made from the same source material as the fine cement fraction is blended with one or more SCM fractions, including at least one SCM having a complementary PSD to the narrow PSD cement fraction. In other embodiments, a fine SCM fraction made from the same source material as the coarse SCM fraction is blended with a hydraulic cement (e.g., OPC) to make a cement-SCM blend.

In some embodiments, a fine SCM fraction can be used as a micro silica material to yield concrete having high durability, low permeability, high paste density, and high strength. In some embodiments, a middle SCM fraction made by removing the ultrafine and coarse SCM particles can be used as a traditional SCM of the same type, while the ultrafine SCM fraction can be used as a high end SCM to make high strength cement-SCM blends and concrete, and the coarse fraction considered by many to be unusable waste can be blended with a finer cement to make a binary blend that performs the same or better than OPC and/or blends of OPC and an SCM of the same type.

In some embodiments, fine SCM materials of different fineness for different purposes are made by classifying a source SCM at a first D90 to yield fine and course SCM fractions, followed by classifying a source SCM at a second D90 to yield a different fine SCM fraction. For example, when making an ultrafine fly ash (UFFA), such as for use as micro silica and/or silica fume substitute, the D90 can be set at less than about 12 μm, 11 μm, 10 μm, 9 μm, 8 μm, 7 μm, 6 μm, or 5 μm. Thereafter, then making a less fine fly that is more reactive than the source fly ash but less reactive than UFFA (e.g., to increase yield), the D90 can be set at about 10 μm, 11 μm, or 12 μm or above and less than about 60 μm, 50 μm, 45 μm, 40 μm, 35 μm, 30 μm, 25 μm, 20 μm, 17.5 μm, 15 μm, or 13 μm.

In some embodiments, a fine cement fraction can be used as a cement blending material to increase the reactivity of another cement, such as OPC to raise the Blaine fineness and/or a substandard cement that would otherwise not meet minimum specification.

In some embodiments, a system for efficiently manufacturing particulate blending materials (PBMs) of different PSD for making particle size optimized cements, SCMs, blended cements and other cement-SCM compositions comprises: (1) one or more air classifiers, and optionally one or more mills, configured to process an initial PBM (e.g., cement and/or SCM) having an initial PSD (e.g., an initial d10 and an initial d90) and yield a plurality of PBM fractions with varying PSDs (e.g., varying d10 and/or d90); (2) a first storage vessel configured to store a first PBM fraction produced by the one or more air classifiers, and optionally one or more mills, having a first PSD that differs from the initial PSD (e.g., a first d90 less than the initial d90); and (3) a second storage vessel configured to store a second PBM fraction produced by the one or more air classifiers, and optionally one or more mills, having a second PSD that differs from the initial PSD and the first PSD (e.g., a second d10 greater than the initial d10 and a d90 greater than the first d90).

In some embodiments, a system for efficiently manufacturing particle size optimized cement-SCM blends comprises: (1) one or more air classifiers, and optionally one or more grinding mills, configured to process a particulate blending material (PBM) having an initial particle size distribution (PSD) (e.g., an initial d10 and an initial d90) and yield a plurality of PBM fractions; (2) a first blending apparatus configured to blend a first PBM fraction processed by the one or more air classifiers, and optionally the one or more mills, with one or more cements and/or SCMs and produce a first cement-SCM blend; and (3) a second blending apparatus configured to blend a second PBM fraction processed by the one or more air classifiers, and optionally the one or more mills, with one or more one or more cements and/or SCMs and produce a second cement-SCM blend.

These and other advantages and features of the invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

Figure 1A:
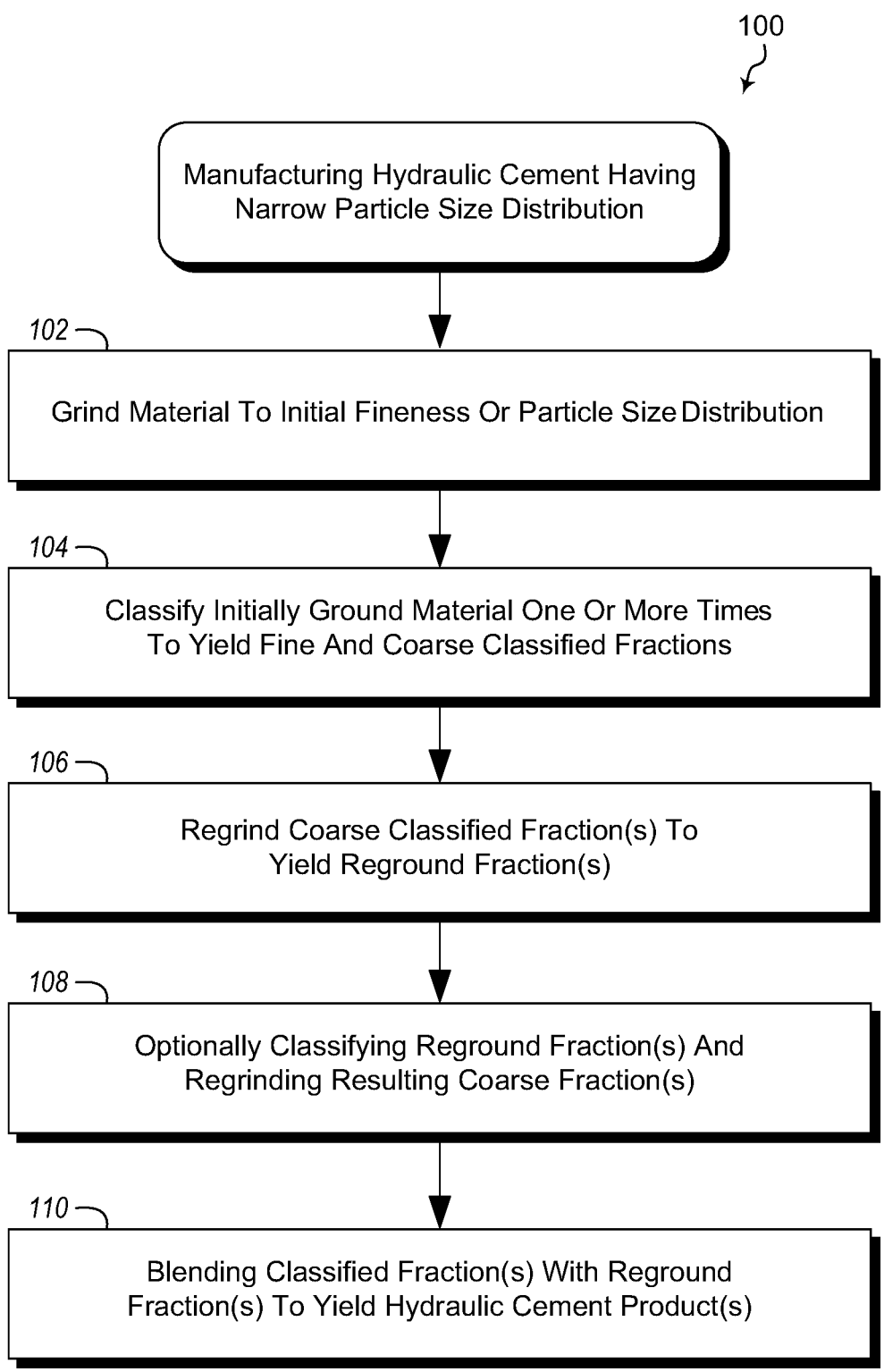
FIG. 1A is a method for manufacturing a cement material of desired PSD.

Disclosed herein are methods and systems for efficiently manufacturing particulate blending materials (PBMs) (e.g., cement and/or SCM) for use in making particle size optimized cement, SCMs, blended cements, and other cement-SCM compositions and also methods and systems for efficiently manufacturing the foregoing. The methods and systems facilitate the manufacture of hydraulic cements having non-traditional particle size distributions (PSDs), such as narrow PSD cements optimized for blending with separate fine and coarse SCM fractions, which are difficult if not impossible to manufacture at existing cement manufacturing plants configured to make general purpose OPC. These or similar methods are useful in converting an available SCM into multiple SCMs of different PSD for blending with cements of different PSDs.

For example, the inventor contacted prominent cement companies, toll grinding facilities, and engineering firms that design and build cement plants throughout the world and was told there is no cement manufacturing plant anywhere in the world configured to commercially produce narrow PSD cements having a d10 between about 5-10 μm and a d90 between about 20-30 μm. This fact is further supported by Zhang et al., "Influence of preparation method on the performance of ternary blended cements," Cement & Concrete Composites 52 (May 2014) 18-26. Zhang et al. state that, although gap graded ternary blends containing narrow PSD cement (8-24 μm), fine SCM (<8 μm), and coarse SCM (>24 μm) can be optimized to contain 25% cement and 75% SCM (25/75 blends), "the preparation procedures of the gap-graded blended cements are conventionally viewed as being too complex for industrial practice." Their solution is to use commercially available OPC produced by a vertical roller mill (VRM) that, while not optimally narrow for making 25/75 blends, is sufficiently narrow that, when blended with fine SCM (<8 μm) and coarse SCM (>24 μm), ternary blends containing 45% cement and 55% SCM (45/55 blends) can be more easily made. One reason that making narrow PSD cements, such as those referenced in Zhang et al. (e.g., 8-24 μm), are "too complex for industrial practice" is that commercially available milling equipment and milling circuits at cement plants are not properly configured to control both the d90 and d10 simultaneously to obtain a narrow PSD cement having both a desired d10 and d90.

The methods and systems disclosed herein provide a relatively simple approach to the efficient manufacture of narrow PSD cements of various non-traditional d10 and d90 values. These methods can also be adapted to prepare SCM fractions of different PSDs for the purpose of using them in making binary and ternary blended cements, with the aim being to produce SCM fractions having PSDs that complement the PSDs of the cements with which they may be blended. In some cases, a narrow PSD cement can be blended with a fine SCM fraction having a lower d90 and/or d10 than the cement and a coarse SCM having a higher d90 and/or d10 than the cement. In other cases, a fine cement "waste" stream produced to make the narrow PSD cement can be useful to make binary blended cements by blending the fine cement with a coarse SCM. Alternatively, it can be used as a blending stock to adjust the Blaine and/or reactivity of a stock OPC or traditional blended cement.

Examples of cement fractions, SCM fractions, binary, ternary and quaternary cement-SCM blends and compositions that can be made according to the methods and systems disclosed herein are found in U.S. Pat. Nos. 7,799,128, 7,972,432, 8,323,399, 8,974,593, 9,067,824, 8,414,700, 8,377,201, 8,551,245 and 9,102,567, the disclosures of which are incorporated herein in their entirety.

The d10 of an example narrow PSD cement useful for blending with one or more SCMs can range from about 1-15 μm, 1.5-12.5 μm, 2-11.5 μm, or 3-10 μm. To the extent it is desired for all cement particles to be fully hydrated at 91 days, 56 days, or 28 days, and depending on the d10 and other factors that affect the reaction depth as a function of time, the d90 of an example narrow PSD cement useful for blending with one or more SCMs can be between about 10-35 μm, about 12-30 μm, about 14-27 μm, or about 16-24 μm.

Including ultrafine cement particles (e.g., below about 7 μm, 6 μm, 5 μm, 4 μm, 3 μm or 2 μm) can be wasteful and undesirable because they require excessive energy to grind, react excessively fast, and retard short- and/or long-term hydration of larger cement particles. They may create too much viscous, non-particulate gel and yield in a more poorly packed particle system. Replacing ultrafine cement particles with slow- or non-dissolving SCM particles provides a particulate system with a higher volume of particulate solids and a lower volume of interstitial water. Including coarse cement particles is wasteful to the extent they do not fully hydrate but leave unhydrated cores as expensive filler, both in terms of manufacturing cost and environmental footprint (e.g., "wasted" $CO_2$ and energy expended to manufacture unhydrated cement filler cores). Providing a narrow PSD cement with a higher d10 and a lower d90 compared to traditional OPC and blending the cement with complementary sized fine and coarse SCM particles maximizes the beneficial strength-imparting effects of the cement fraction while lowering water demand and w/cm and increasing strength.

Because a narrow PSD cement can have lower particle packing density (PPD) than OPC, it may be desirable to increase the PPD of the overall cement-SCM blend by selecting one or more SCMs that provide complementary sized particles. According to one embodiment, at least one SCM fraction is provided that has a mean particle size (MPS) that differs from the MPS of the narrow PSD cement fraction by a multiple of at least 3.0, more preferably at least about 3.25, 3.5, 3.75, 4, 4.25, 4.5, 5, 5.5 or 6, in order to yield a cement-SCM blend having an "initial PPD" (before adding water) of at least 57.0%, more preferably at least about 58%, 60%, 62.5%, 65%, 70%, or 75%.

For example, if the d50 of a narrow PSD cement is 15 µm, an exemplary cement-SCM blend may include a first fine SCM fraction having a d50 of 10 µm, 9 µm, 8 µm, 7 µm, 6 µm, or 5.0 µm or less and a second coarse SCM fraction having a d50 of 25 µm, 30 µm, 35 µm, 40 µm, 45 µm, 50 µm, 55 µm, 60 µm, 65 µm, 70 µm, or 75 µm or greater. The use of separate fine and coarse SCM fractions on one or both sides of the narrow PSD cement fraction is beneficial for many reasons, including, but not limited to, reduced capillary pore volume, which reduces permeability and transport and increases durability and resistance to chemical attack, reduced autogenous shrinkage and creep, a reduced amount of water within the cement paste to yield a given flow, and increased volumetric paste density (i.e., when normalized for specific gravities of the SCM and cement fractions).

Fine SCMs also provide the added benefit of being highly reactive and can impart substantially higher early and/or late strength compared to SCMs of normal PSD. Fine and ultrafine SCMs typically begin reacting after the cement fraction initially sets and forms a rigid or semi-rigid structure. Nonetheless, during mixing and placement, fine SCMs, even ultrafine fly ash (UFFA), are essentially unreactive, do not consume water, and therefore greatly reduce water demand. Using less water to achieve the same flow can substantially increase both short and long-term strengths. Therefore, using a fine or ultrafine SCM particles in place of at least some of the fine or ultrafine cement particles substantially improves flow and strength.

Cement-SCM blends are an improvement over OPC, which includes a substantial quantity of coarse cement particles that never fully hydrate and are "wasted" cement. OPC is generally only optimized for use with itself and without regard to its behavior when used with SCMs. This is especially true when OPC is used by concrete manufactures to make "site blends" with SCMs or when SCMs and OPC are otherwise "self-blended" by the end user. Cement-SCM blends made using separately processed cement and SCM fractions is an improvement over interground cement-SCM blends, which seek to "fix" SCMs and make them more reactive by intimate grinding with OPC. Interground cement-SCM blends are generally more reactive and produce higher strength than site blends or other self-blended cementitious compositions. Nevertheless, interground blends often have higher water demand as a result of increased fineness, can have an even lower PPD than OPC, and may require greater quantities of (and/or more expensive) water reducers. However, mixing an interground blend with an SCM of complementary particle size, such as mixing a fine interground blend with a coarse SCM or mixing a coarse interground blend with a fine SCM can substantially increase particle packing density of the overall cement blend, reducing water demand, increasing paste density, increasing strength, reducing porosity and shrinkage.

The terms "hydraulic cement" and "cement" shall include Portland cement, cements defined by ASTM C150 (Types I-V) and similar materials that contain one or more of the four clinker minerals: $C_3S$ (tricalcium silicate), $C_2S$ (dicalcium silicate), $C_3A$ (tricalcium aluminate), and $C_4AF$ (tetracalcium aluminoferrite). Other examples of hydraulic cement include white cement, calcium aluminate cement, high-alumina cement, magnesium silicate cement, magnesium oxychloride cement, oil well cements (e.g., Type VI, VII and VIII), magnesite cements, and combinations of these. Ground granulated blast-furnace slag (GGBFS) and other slags that include one or more clinker minerals may also function as hydraulic cement. They also qualify as SCMs. Some highly reactive class C fly ashes have self-cementing properties and can qualify as "hydraulic cement".

Consistent with defining GGBFS, slags and reactive fly ashes as "hydraulic cement", alkali-activated cements, sometimes known as "geopolymer cements", are also examples of "hydraulic cements". It will be appreciated that when geopolymer cements or other highly reactive pozzolans are used, two or more separately graded pozzolan fractions may be combined together.

The terms "Supplementary Cementitious Material" and "SCM" shall include materials commonly used in the industry as partial replacements for Portland cement in concrete, mortar and other cementitious materials, either in blended cements or by self-blending in the end user. Examples range from highly reactive materials (e.g., GGBFS), moderately reactive materials (e.g., Class C fly ash, steel slag, silica fume, activated metakaolin, metastable forms of $CaCO_3$), lower reactive materials (e.g., Class F fly ash, volcanic ash, natural pozzolans, trass, and metastable forms of $CaCO_3$), and essentially non-reactive materials and fillers (e.g., ground limestone, ground quartz, precipitated $CaCO_3$, precipitated $MgCO_3$). Through alkali activation, it is possible for some SCMs to also become hydraulically reactive. In a sense, the pozzolanic reaction is a form of alkali activation, albeit by less basic and/or soluble calcium ions as compared to more basic and/or soluble sodium or potassium ions as in typical geopolymer cements.

According to one embodiment, the PSD of the cement fraction can be defined by its d10, d50 and d90, with the d10 approximating the lower PSD endpoint ("LEP"), the d90 approximating the upper PSD endpoint ("UEP"), and the d50 approximating the mean particle size ("MPS") of the PSD. In other embodiments, the d1, d5, d15, or intermediate value can be used as the approximate LEP, the d85, d95, d99, or intermediate value as the approximate UEP, and the d40, d45, d55, d60 or intermediate value as the approximate MPS.

Narrow PSD cements are typically characterized as having a spread (e.g., UEP-LEP) and endpoint ratio (e.g., UEP/LEP) that are lower than the spread and endpoint ratio, respectively, of OPC, often substantially lower. Lowering the UEP reduces the volume of unhydrated cement cores, which increases hydration efficiency. Raising the LEP reduces water demand. In one embodiment, a narrow PSD cement fraction can have a LEP that is substantially higher, and a UEP that is substantially lower, than the respective LEP and UEP of OPC (e.g., for both Fuller and Tsivilis distributions).

For example, compared to Types I, II, IV and V OPC as defined by ASTM C150, the d10 of a narrow PSD cement can be substantially higher than the d10, and, in most cases, the d90 of a narrow PSD cement can be substantially lower than the d90, of these types of OPC. As compared to Type III OPC as defined by ASTM C150, the d10 of a narrow PSD cement can be substantially higher than the d10, and the d90 of the narrow PSD cement can be the same or less than the d90, of Type III OPC.

In one embodiment, the PSD of the cement fraction can be defined by the upper and lower PSD "endpoints" UEP and LEP (e.g., d90 and d10). The PSD can also be defined by the spread or difference between UPE and LPE (e.g., "d90–d10"). In another embodiment, the PSD of the cement fraction can be defined by the upper and lower endpoint ratio UEP/LEP (e.g., d90/d10). In yet another embodiment, the PSD can be defined by the lower median range LEP and MPS (e.g., d10 and d50). In still another embodiment, the PSD can be defined by the lower median ratio MPS/LEP (e.g., d50/d10). In another embodiment, the PSD can be defined by the upper median range MPS and UEP (e.g., d50 and d90). In yet another embodiment, the PSD can be defined by the upper median ratio UEP/MPS (e.g., d90/d50). The PSD can also be defined by any combination of the foregoing and/or similar methodologies to increase reactivity and/or decrease water demand compared to OPC and conventional cement-SCM blends.

To ensure the cement fraction has a PSD within desired parameters, care should be taken to accurately determine particle size. The particle size of perfectly spherical particles can be measured by diameter. While fly ash is generally spherical owing to how it is formed, Portland cement and some SCMs can be non-spherical (i.e., when ground from larger particles). For these, "particle size" can be determined according to accepted methods for determining particle sizes of ground or otherwise non spherical materials. Particle size can be measured by any acceptable method and/or methods yet to be developed. Examples include sieving, optical or electron microscope analysis, laser diffraction, x-ray diffraction, sedimentation, elutriation, microscope counting, Coulter counter, and Dynamic Light Scattering.

Defining PSD by Lower and Upper Endpoints

The upper endpoint (UEP) can be selected to provide desired reactivity and/or fineness in conjunction with or independent of the lower endpoint (LEP) and/or a desired particle packing density in conjunction with one or more coarser SCMs. The UEP (e.g., d85, d90, d95 or d99) can be equal to or less than about 35 µm, 30 µm, 27.5 µm, 25 µm, 22.5 µm, 20 µm, 18 µm, 16.5 µm, 15 µm, 13.5 µm, 12 µm, 11 µm, or 10 µm. The lower UEP range limit can be about 8 µm, 9 µm, 10 µm, 11 µm, 12 µm, 13 µm, 14 µm or 15 µm.

The lower endpoint (LEP) can be selected to provide desired water demand and/or fineness in conjunction with or independent of the upper endpoint (UEP) and/or desired particle packing density in conjunction with one or more finer SCMs. The LEP (e.g., d1, d5, d10 or d15) can be equal to or greater than about 1.0 µm, 1.25 µm, 1.5 µm, 1.75 µm, 2 µm, 2.5 µm, 3 µm, 4 µm, 5 µm, 6 µm, 7 µm, or 8 µm. The upper LEP limit can be about 6 µm, 8 µm, 10 µm, 12 µm or 15 µm.

The UEP and LEP can also define the spread (UPE-LEP) of the hydraulic cement. By way of example, depending on the UEP and LEP of the cement and ability or limitations of processing equipment to produce narrow PDS cements, the spread can be less than about 30 µm, 22.5 µm, 20 µm, 17.5 µm, 15 µm, 13 µm, 11.5 µm, 10 µm, 9 µm, 8 µm, 7 µm, 6 µm, 5 µm, or 4 µm.

Defining PSD by UEP/LEP

In another embodiment, the ratio UEP/LEP can define a narrow PSD cement having desired reactivity, fineness and/or particle packing density in conjunction with one or more SCMs. The UEP/LEP (e.g., d90/d10) of narrow PSD cements can be less than the ratio of Types I-V cements as defined by ASTM C-150. According to several embodiments, the UEP/LEP can be less than or equal to about 25, 22.5, 20, 17.5, 15, 12.5, 10, 8, 6, 5, 4.5, 4, 3.5, 3, 2.5 or 2.

It will be appreciated that defining the PSD of a narrow PSD cement by ratio UEP/LEP is not limited by a particular UEP or LEP or range of particle sizes. For example, a first hypothetical narrow PSD cement having a d90 of 15 µm and a d10 of 3 µm has a UEP/LEP (i.e., d90/d10) of 5 and spread (d90–d10) of 12 µm. By comparison, a second hypothetical narrow PSD cement having a d90 of 28 µm and a d10 of 7 µm has a UEP/LEP (i.e., d90/d10) of 4 and a spread (d90–d10) of 21 µm. While the spread of the second hypothetical narrow PSD cement is greater the UEP/LEP (i.e., d90/d10) is smaller than those of the first hypothetical narrow PSD cement. Thus, the second hypothetical cement has a narrower PSD compared to the first hypothetical cement as defined by UEP/LEP (i.e., d90/d10) even though the spread is greater.

Exemplary SCM Fractions

The PSD of one or more SCM fractions can be defined by the d10, d50 and d90, with the d10 approximating the lower PSD endpoint (LEP), the d90 approximating the upper PSD endpoint (UEP), and the d50 approximating the mean particle size ("MPS"). In other embodiments, the d1, d5, d15 or intermediate value can be used to approximate LEP, the d85, d95, d99 or intermediate value to approximate UEP, and the d40, d45, d55, d60 or intermediate value to approximate MPS. In some cases, the PSD of a fine SCM fraction may be defined mainly or exclusively in terms of the MPS and/or the UEP, while the PSD of a coarse SCM fraction may be defined mainly or exclusively in terms of the MPS and/or the LEP.

Fine SCM Fraction

Blending a fine SCM fraction with a narrow PSD cement can "replace" at least a portion of ultrafine cement particles, help disperse cement particles, fill fine pore spaces, increase fluidity, increase strength, increase particle packing density, and decrease permeability.

To achieve particle packing relative to the narrow PSD cement, the MPS of the narrow PSD cement fraction can be at least about 3.0 times, 3.25 times, 3.5 times, 3.75 times, 4 times, 4.5 times, 5 times, 5.5 times, or 6 times the MPS of the fine SCM fraction (e.g., about 3.0-10 times, 3.25-8 times or 3.5-6 times). In some cases, the engineered cement-SCM blend may include one or more coarse SCM fractions that, together with the narrow PSD cement fraction, provide sufficient particle packing density that the fine SCM fraction may be merely gap graded relative to the cement fraction (e.g., where the MPS of the cement fraction is less than 3.0 times, 2.8 times, 2.7 times, 2.6 times, or 2.5 times the MPS of the fine SCM fraction).

The UEP of the fine SCM fraction can be selected to be less than, approximately equal to, or greater than the LEP of the narrow PSD cement fraction. In general, the lower the UEP of the fine SCM fraction is relative to the LEP of the cement fraction, the higher is the particle packing density. According to several embodiments of the invention, the degree of overlap can be less than about 25%, 18%, 12%, 8%, 4% or 2% by weight of the combined fractions. In other embodiments, there may be a gap of at least about 1%, 2.5%, 5%, 7.5% 10%, 12.5%, 15%, 17.5% or 20% between the UEP of the fine SCM and the UEP of the narrow PSD cement.

The UEP (e.g., d85, d90, d95 or d99) of a fine SCM can be less than about 18 μm, 15 μm, 12 μm, 10 μm, 9 μm, 8 μm, 7 μm, 6 μm, 5 μm, 4.5 μm, 4 μm, 3.5 μm, or 3 μm. The lower UEP range limit can be about 1 μm, 2 μm or 3 μm. The LEP (e.g., d1, d5, d10 or d15) can be equal to or greater than about 0.01 μm, 0.05 μm, 0.1 μm, 0.5 μm, 1.0 μm, 1.25 μm, 1.5 μm, 1.75 μm, 2 μm, 2.5 μm, 3 μm, 4 μm, or 5 μm. The upper LEP range limit can be about 8 μm, 6 μm, 5 μm or 4 μm.

Coarse SCM Fraction

Blending a coarse SCM fraction with a narrow PSD cement can "replace" coarse cement particles, increase particle packing, provide a filling effect using a less expensive component, lower the w/cm, increase fluidity, increase strength, reduce shrinkage, and reduce creep.

To achieve particle packing relative to the narrow PSD cement, the MPS of the coarse SCM fraction can be at least 3.0 times, 3.25 times, 3.5 times, 3.75 times, 4 times, 4.25 times, 4.5 times, 5 times, 5.5 times, or 6 times the MPS of the narrow PSD cement fraction (e.g., about 3.0-10 times, 3.25-8 times or 3.5-6 times). In some cases, the engineered cement-SCM blend may include a fine SCM fraction and/or a second coarser SCM fraction that, together with the narrow PSD cement fraction, provides sufficient particle packing density that the coarse SCM fraction may be merely gap graded relative to the cement fraction (e.g., where the MPS of the coarse SCM fraction is less than 3.0 times, 2.8 times, 2.7 times, 2.6 times, or 2.5 times the MPS of the narrow PSD cement fraction).

The LEP of the coarse SCM fraction can be selected to be less than, approximately equal to, or greater than the UEP of the narrow PSD cement fraction. In general, the higher the LEP of the coarse SCM fraction is relative to the UEP of the cement fraction, the higher is the particle packing density. According to several embodiments of the invention, the degree of overlap can be less than about 25%, 18%, 12%, 8%, 4% or 2% by weight of the combined fractions. In other embodiments, there may be a gap of at least about 1%, 2.5%, 5%, 7.5%, 10%, 12.5%, 15%, 17.5% or 20% between the LEP of the coarse SCM and the LEP of the narrow PSD cement.

The LEP (e.g., d1, d5, d10 or d15) of a coarse SCM can be equal to or greater than about 8 μm, 10 μm, 12.5 μm, 15 μm, 17.5 μm, 20 μm, 22.5 μm, 25 μm, 30 μm, 35 μm, 40 μm, or 50 μm, with an upper LEP range limit of about 30 μm, 40 μm, 50 μm, 60 μm, 70 μm, 80 μm or 90 μm. The UEP (e.g., d85, d90, d95 or d99) of a coarse SCM can be less than about 300 μm, 250 μm, 200 μm, 175 μm, 150 μm, 125 μm, 110 μm, 100 μm, 90 μm, 85 μm, 80 μm, 75 μm, 70 μm, 65 μm, or 60 μm, with a lower UEP range limit of about 30 μm, 40 μm, 50 μm, or 60 μm.

Second Coarse SCM

In the case where the cement-SCM blend includes a narrow PSD cement fraction having a relatively low UEP and/or a coarse SCM fraction having a relatively low UEP, it may be desirable to include a second coarse SCM fraction that has a higher MPS than the MPS of the first coarse SCM fraction, advantageously is higher LEP than the UEP of the first coarse SCM (e.g., in order to provide additional particle packing relative to the narrow PSD cement fraction and/or fine aggregate in concrete or mortar).

The MPS of the second coarse SCM fraction can differ by a multiple of 3.0 or more relative the MPS of the first coarse SCM fraction (e.g., so as to provide an "ultra-coarse SCM fraction) and/or fine aggregate (e.g., sand) to maximize particle packing potential. Alternatively, the second coarse SCM fraction may be merely gap graded relative to the first coarse SCM fraction and/or fine aggregate (e.g., where the MPS of the second coarse SCM fraction differs by a multiple of less than 3.0. 2.75, 2.5, 2.0, or 1.5 relative to the MPS of the first coarse SCM fraction and/or fine aggregate).

Alternatively, two different coarse SCMs of similar PSD but having different mineral constituents can be used to provide different effects. For example, using coarse fly and a coarse limestone can broaden the PSD of the overall cement blend but offer different benefits. Coarse fly ash can reactive pozzolanically over time, at least in theory, but does not contribute much to early strength. Coarse limestone does not react pozzolanically but can provide nucleation sites and/or form calcium carbonaluminates in order to accelerate early strength gain. Together, coarse fly ash and coarse limestone can boost both early and late strengths.

Manufacturing Methods and Systems

FIG. 1A is a flow chart illustrating an example method 100 for manufacturing cement having a desired PSD. Example manufacturing apparatus are illustrated in FIGS. 4A-4D, 5A-4D, 6A-6F, 7A-7E and 8 (discussed below). In act 102, cement clinker (e.g., clinker used to make Types I-V Portland cement or Type VI-VIII oil well cement) is ground to an initial fineness and/or PSD. This can be performed by known or modified grinding apparatus such as a rod mill, vertical roller mill ("VRM"), jaw crusher, high pressure grinding roll, Raymond mill, hammer mill, or ball mill. The desired fineness and/or PSD of the initial cement may be selected based on subsequent classification and regrinding processes. The d10 of the initial ground cement will advantageously be as high or higher than the d10 of the narrow PSD cement.

In act 104, the initial ground cement is processed using one or more separators to yield cement fractions having different PSDs, including at least one finer fraction, which may be collected without further modification, and at least one coarser fraction. The finer cement fraction has a d90 that may be equal to, approximate, or be within a specified deviation of the d90 of the final cement product. The finer cement fraction will typically have a lower d10 than the initial ground cement by removing the coarser particles. The coarser fraction can optionally be dedusted one or more times to further remove fine particles and yield a coarse cement better suited for subsequent milling without forming an excessive quantity of ultrafine cement particles. Fines produced by dedusting can be blended with the finer fraction.

In act 106, the coarse fraction(s) produced by classification 104 are milled using appropriate milling apparatus, such as rod mill, VRM, fine grinding roll press, high pressure grinding roll, ball mill, impact ball mill, hammer mill, jet mill, dry bead mill, ultrasonic comminuting mill, or other mill designed to mill cement particles and yield one or more reground cement fractions having a desired d90, preferably without producing an undesired quantity of ultrafine particles. A reground cement intermediate can be processed one or more times by optional classifying act 108 to yield one or more additional fine cement fractions having a desired d90 and d10 and a coarser cement fraction that can be reground. Regrinding 106 and optional classifying 108 can be performed by the same or different apparatus used for initial grinding 102.

In act 110, one or more classified fine fractions are blended with one or more reground coarse fractions to yield one or more cement products having a desired d90 and d10. Blending can be performed by dedicated dry blending apparatus and/or one or more classifiers described above and/or illustrated in the Figures.

In one embodiment, it may be desirable to dedust one or more fine fractions and/or the final material to raise the d10 as desired. The removed fine particles typically have high value and can be beneficially used in applications where high fineness cements are desired, such as in making grout. The removed fines can alternatively be used as a blending material for OPC or other cements to raise Blaine fineness.

In contrast or addition to the example method disclosed above relative to FIG. 1A, methods according to the invention form multiple particulate blending materials (PBMs) from a single stock material to yield PBM fractions of different PSD. The PBMs can be cement and/or SCM materials. In this way, a commercially available or producible cement and/or SCM material can be separated into two or blending fractions of differing PSD. In some embodiments, cement and SCM fractions of complementary PSD can be blended together to make binary and ternary blends having optimized particle sizes, strength, durability, lower water demand, higher paste density, and the like. In some embodiments, one of the cement fractions can be blended with one or more SCM fractions of complementary size. In other embodiments, a fine SCM fraction can be used as a highly reactive SCM together with OPC while a coarse SCM fraction made from the same material can be blended with a fine or narrow PSD cement to make a particle size optimized blend. In other embodiments, a fine cement fraction can be blended with a coarse SCM fraction of complementary PSD. In other embodiments, a narrow PSD cement fraction can be blended with a fine and coarse SCM fractions of complementary PSD. In other embodiments, a fine cement can be blended with OPC or traditional blended cements to increase fineness and/or reactivity.

The methods and systems facilitate the manufacture of hydraulic cements and SCMs having non-traditional particle size distributions ("PSDs"), such as narrow PSD cements optimized for blending with one or more supplementary cementitious materials (SCMs). The methods and systems can also be used to control and optimize the PSDs of one or more SCM fractions for blending with hydraulic cement to make blended cement or other cement-SCM compositions. In particle size optimized compositions, the cement and SCM fractions can have different, such as complementary, PSDs to yield a cement-SCM composition having a broadened PSD compared to individual particulate components.

In some embodiments, a method for efficiently manufacturing particulate blending materials (PBMs) of different PSD for making particle size optimized cements, SCMs, blended cements and other cement-SCM compositions comprises: (1) processing an initial PBM selected from hydraulic cement and SCM and having an initial PSD (e.g., an initial d10 and an initial d90) in one or more air classifying steps, and optionally in one or more milling steps, to yield a plurality of PBM fractions with varying PSDs (e.g., varying d10 and/or d90); (2) collecting a first PBM fraction having a first PSD that differs from the initial PSD (e.g., a first d90 less than the initial d90); and (3) collecting a second PBM fraction having a second PSD that differs from the initial and first PSDs (e.g., a second d10 greater than the initial d10 and a second d90 greater than the first d90).

In some embodiments, a method for efficiently manufacturing cement blending materials of different PSD for making particle size optimized cements, blended cements, and other cement-SCM compositions comprises: (1) processing an initial hydraulic cement or ground clinker having an initial PSD (e.g., an initial d10 and an initial d90) in one or more air classifying steps, and optionally in one or more milling steps, to yield a plurality of cement blending fractions with varying PSDs (e.g., varying d10 and/or d90); (2) collecting a first cement blending fraction having a first PSD that differs from the initial PSD (e.g., a first d90 less than the initial d90); and (3) collecting a second cement blending fraction having a second PSD that differs from the initial PSD and the first PSD (e.g., a second d10 greater than the initial d10 and a second d90 greater than the first d90).

In some embodiments, a method for efficiently manufacturing SCM blending fractions of different PSD for making particle size optimized SCMs, blended cements, and other cement-SCM compositions comprises: (1) processing an initial SCM having an initial PSD (e.g., an initial d10 and an initial d90) in one or more air classifying steps, and optionally in one or more milling steps, to yield a plurality of SCM blending fractions with varying PSDs (e.g., varying d10 and/or d90); (2) collecting a first SCM blending fraction having a first PSD that differs from the initial PSD (e.g., a first d90 less than the initial d90); and (3) collecting a second SCM blending fraction having a second PSD that differs from the initial PSD and the first PSD (e.g., a second d10 greater than the initial d10 and a second d90 greater than the first d90).

Different blending material fractions can be combined with other blending material fractions and/or traditional OPC and/or traditional SCMs as desired to yield a desired cement, SCM, blended cement, or cement-SCM composition. In some embodiments, a fine cement (e.g., d90<25 µm) can be blended with a coarse SCM (e.g., d90>25 µm) to form a binary blend having an overall PSD broader than either the fine cement or coarse SCM individually. In other embodiments, a narrow PSD cement (e.g., d90<30 µm and d10>1.5 µm) can be blended with a fine SCM (e.g., d90<10 µm) and a coarse SCM (d10>5 µm and d90>30 µm) to form a ternary blend having an overall PSD broader than either the narrow PSD cement, fine SCM, or coarse SCM individually. Because binary and ternary blends made in this manner can have greater early strength, durability, and other beneficial properties compared to traditional blends of OPC and SCMs, dividing the cement and/or SCM materials into multiple blending fractions of different PSD and the blending them so that the cement and SCM fractions complement each other can yield two or more cement-SCM compositions having superior properties than traditional blended cements. The ratios of the different particulate blending materials can be altered to yield blends having a wide variety of cement substitution levels, strengths, durabilities, and the like.

In some embodiments, a method for efficiently manufacturing a particle size optimized cement-SCM composition comprises: (1) obtaining a fine cement fraction having a d90 less than a d90 of specified value; (2) obtaining a coarse SCM fraction having a d90 greater than the specified value; and (3) blending the fine cement and coarse SCM fractions to form a cement-SCM composition. In some embodiments, a narrow PSD cement fraction made from the same source material as the fine cement fraction is blended with one or more SCM fractions, including at least one having a complementary PSD as the narrow PSD cement fraction. In other embodiments, a fine SCM fraction made from the same source material as the coarse SCM fraction is blended with a hydraulic cement (e.g., OPC) to make a cement-SCM blend.

Figure 1B:
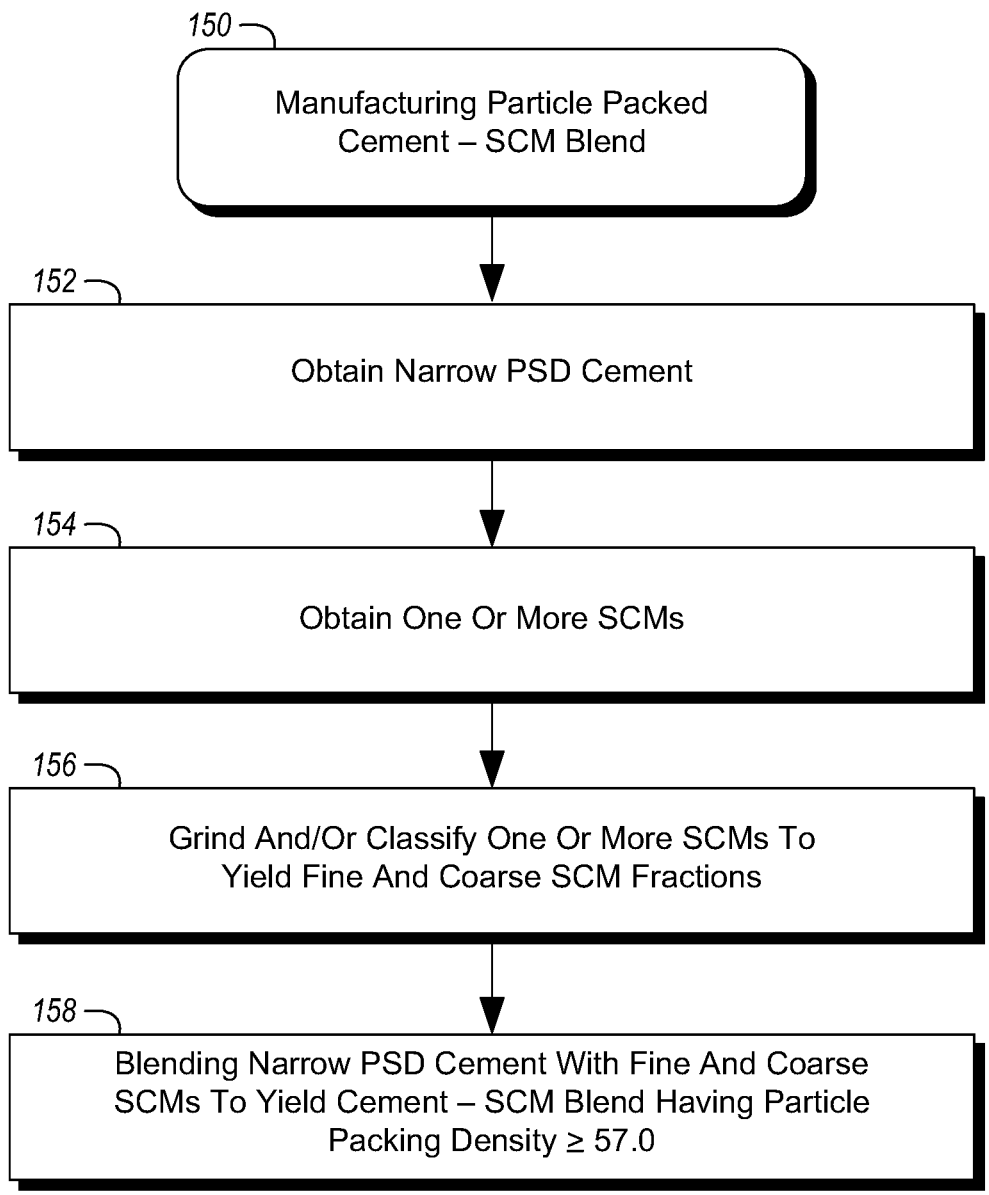
FIG. 1B is a method for manufacturing a cement-SCM blend of high particle packing density.

In some embodiments, a fine or ultrafine SCM fraction can be used as a micro silica material to yield concrete having high durability, low permeability, high paste density, and high strength. In some embodiments, a middle SCM fraction made by removing ultrafine and coarse SCM particles can be used as a traditional SCM of the same type, while the ultrafine SCM fraction can be used as a high end SCM to make high strength cement-SCM blends and concrete, and the coarse fraction, considered by many to be unusable waste, can be blended with a finer cement to make a binary blend that performs the same or better than OPC and/or blends of OPC and an SCM of the same type. In some embodiments, a fine cement fraction can be used as a cement blending material to increase the reactivity of another cement, such as OPC to raise the Blaine fineness and/or a substandard cement that would otherwise not meet minimum specification. In some embodiments, the d90 of the SCM can be adjusted to provide a plurality custom SCM FIG. 1B is a flow chart illustrating an example method 150 for manufacturing example ternary cement-SCM composition. In step 152, a cement fraction of medium fineness is obtained, such as a narrow PSD cement, or alternatively OPC. In step 154, one or more SCMs are obtained. In step 156, the one or more SCMs are ground and/or classified to yield fine and coarse SCM fractions (e.g., using any apparatus described herein for grinding and separating cement). In step 158, the narrow PSD cement is blended with the fine and coarse SCM fractions to yield a ternary cement-SCM blend. The foregoing method can be adapted to yield a binary cement-SCM blend (e.g., fine cement and coarse SCM fractions), a ternary blend (e.g., fine SCM, narrow PSD cement, and coarse SCM fractions), or quaternary blend (e.g., fine SCM, narrow PSD cement, first coarse SCM fraction, and second coarser SCM fractions).

Even when fine and coarse SCM fractions made from the same source SCM are used, the ratio of the two can be altered so that the effect is not simply recombining the two to yield the source material. For example, including a higher ratio of fine to coarse SCM fractions yields a finer, more reactive SCM; including a higher ratio of fine to coarse SCM fractions yields a coarser, less reactive SCM. Typically, however, a portion of the unused material is used in a different blend to form blended cement so that most or all of the source SCM is beneficially utilized.

Where ultrafine, fine and coarse SCM fractions are produced from the source SCM, the ultrafine fraction can be used in a first blended cement, such as ultrafine SCM as micro silica and OPC, to yield high strength concrete. The fine SCM fraction can be used with OPC much like regular SCM (e.g., fly ash) would be used. The coarse SCM fraction can be used with fine cement to make a binary blend or with OPC as coarse mineral filler, such as to replace a portion of the sand to yield higher strength and/or higher durability concrete. In some embodiments, the ultrafine and coarse SCM fractions can be used with a medium fineness cement to yield a particle size optimized ternary blend, with the removed fine SCM fraction providing a gap in the grading of the ultrafine and coarse SCM fractions. This gap can be filled by the medium fineness cement to yield a ternary blend. The medium fineness SCM can be used as is or ground more finely to yield a high end micro silica material.

Figure 2:
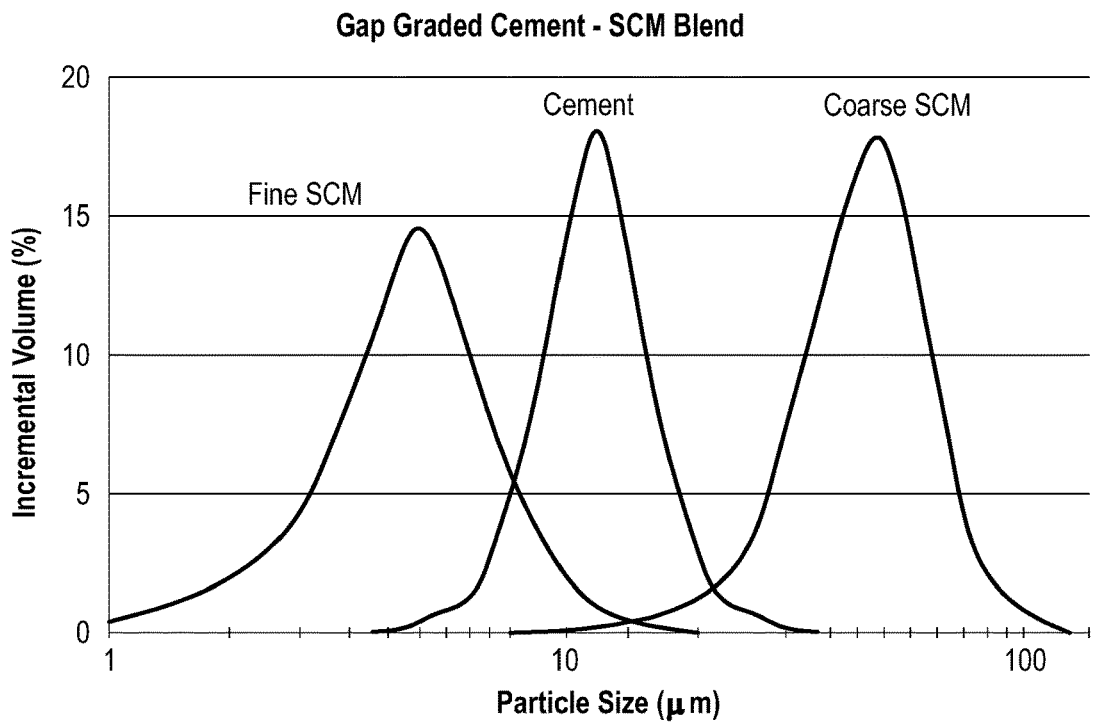
FIG. 2 is graph that schematically illustrates example PSDs of cement and SCM components of a gap-graded cement-SCM blend.

FIGS. 2 and 3A-3E show the PSDs of cement and SCM fraction of various cement-SCM blends. FIG. 2 is graph that schematically illustrates, for comparison purposes, PSDs of the fine SCM, cement, and coarse SCM fractions of an example gap graded cement-SCM blend having a PPD of less than 57.0 (i.e., between 50.17-53.63). FIGS. 3A-3E are graphs that schematically illustrate example particle packed cement-SCM blends. A characteristic of the gap graded blend of FIG. 2 is the considerable overlap in the PSDs of the three adjacent fractions, and even some overlap between the fine and coarse SCM fractions. Another characteristic is a smaller separation between the MPS of all three fractions (i.e., MPS multiple of less than 3.0 times between adjacent fractions). The result is a PPD that is only marginally higher than the PPD of a corresponding OPC (i.e., 46.88).

Figure 3A:
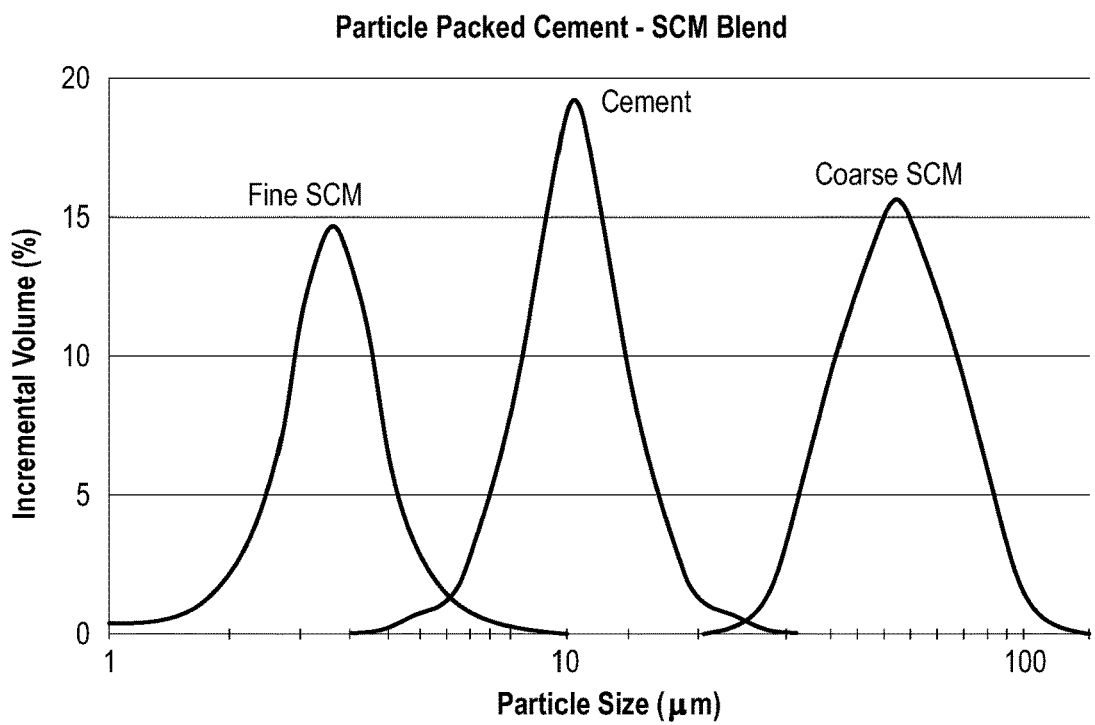
FIGS. 3A-3E are graphs that schematically illustrate example PSDs of cement and SCM components of exemplary particle packed cement-SCM blends FIGS. 4A-4D schematically illustrate example single classifier milling and classification systems for manufacturing a particulate blending material (PBM) having a desired particle size distribution (PSD)
Figure 3B:
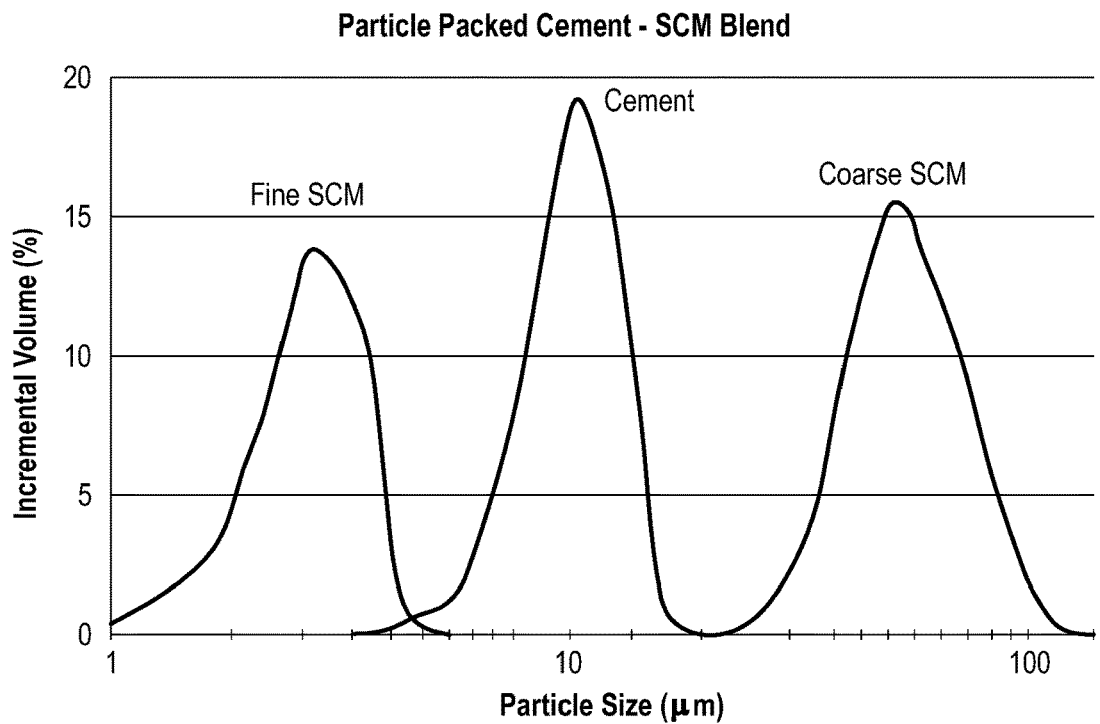

In contrast, the PSDs of the example particle packed cement-SCM blends illustrated in FIGS. 3A-3E have little or no overlap and/or have larger separations between the MPS of each adjacent fraction. FIG. 3A schematically illustrates an example ternary blend in which there is minimal overlap between the fine SCM and cement fractions and the cement and coarse SCM fractions, and no overlap between the fine and coarse SCM fractions. In addition, the MPS multiple between adjacent fractions is 3.0 times or greater. FIG. 3B schematically illustrates another example ternary blend in which there is virtually no overlap between adjacent fractions and the MPS multiple between adjacent fractions is 3.0 times or greater.

Figure 3C:
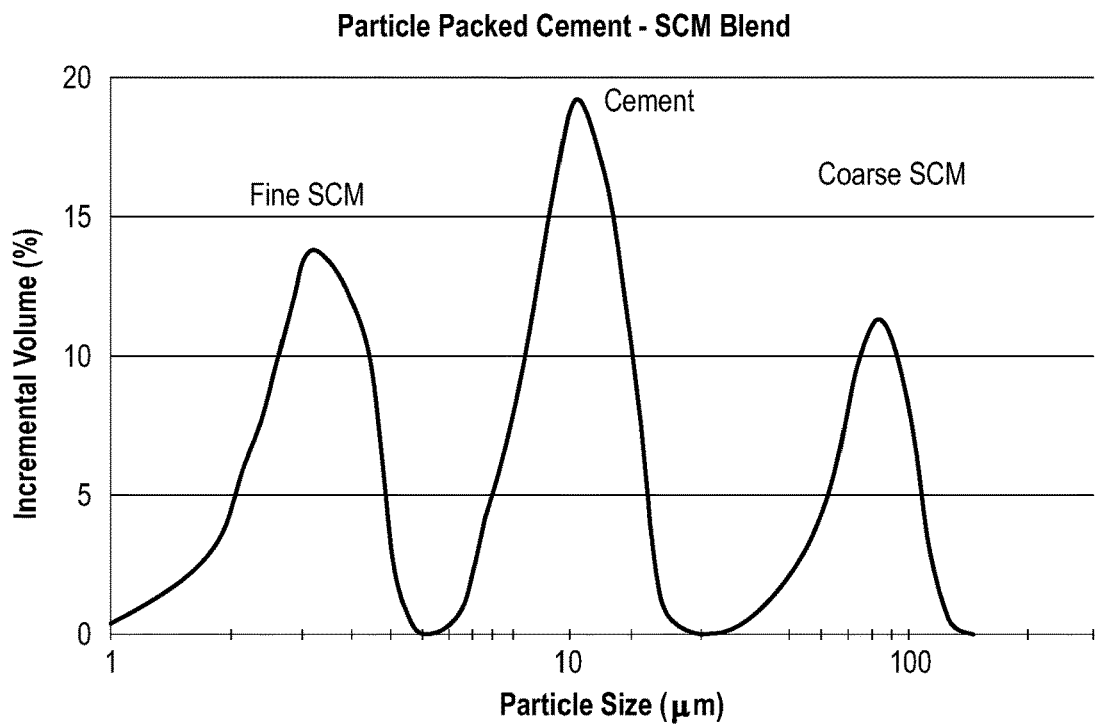

FIG. 3C schematically illustrates another example ternary blend in which there is no overlap between adjacent fractions and even a gap between the smallest particles of the coarse SCM and the largest particles of the cement. The MPS multiple between adjacent fractions is even greater.

Figure 3D:
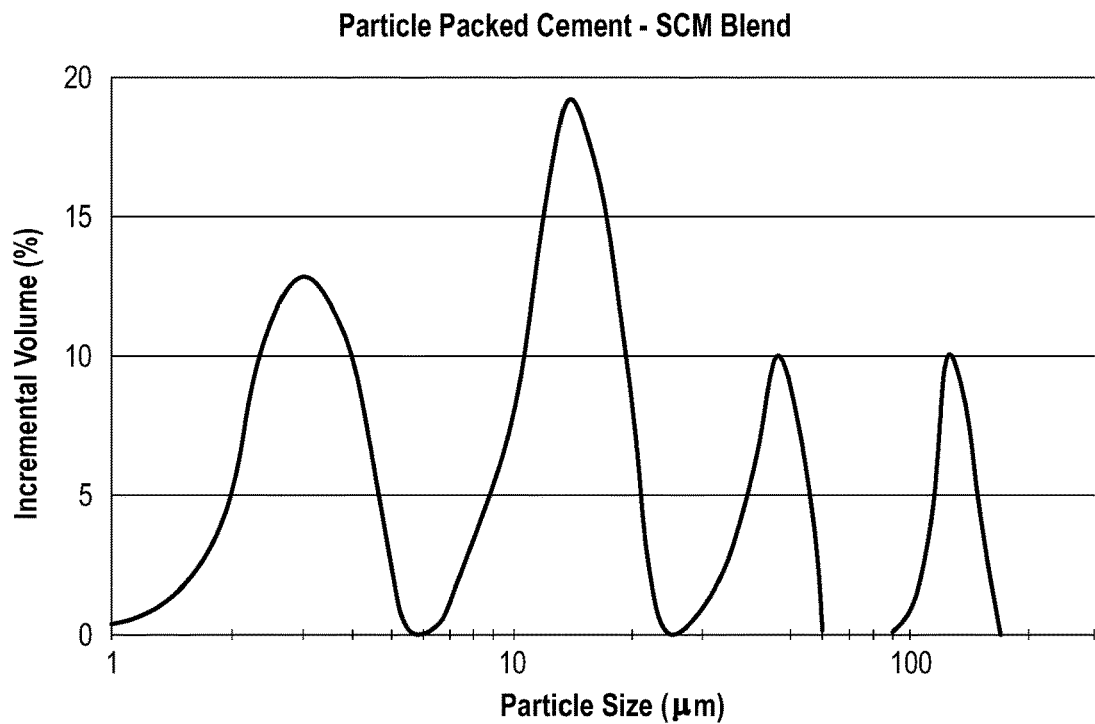
Figure 3E:
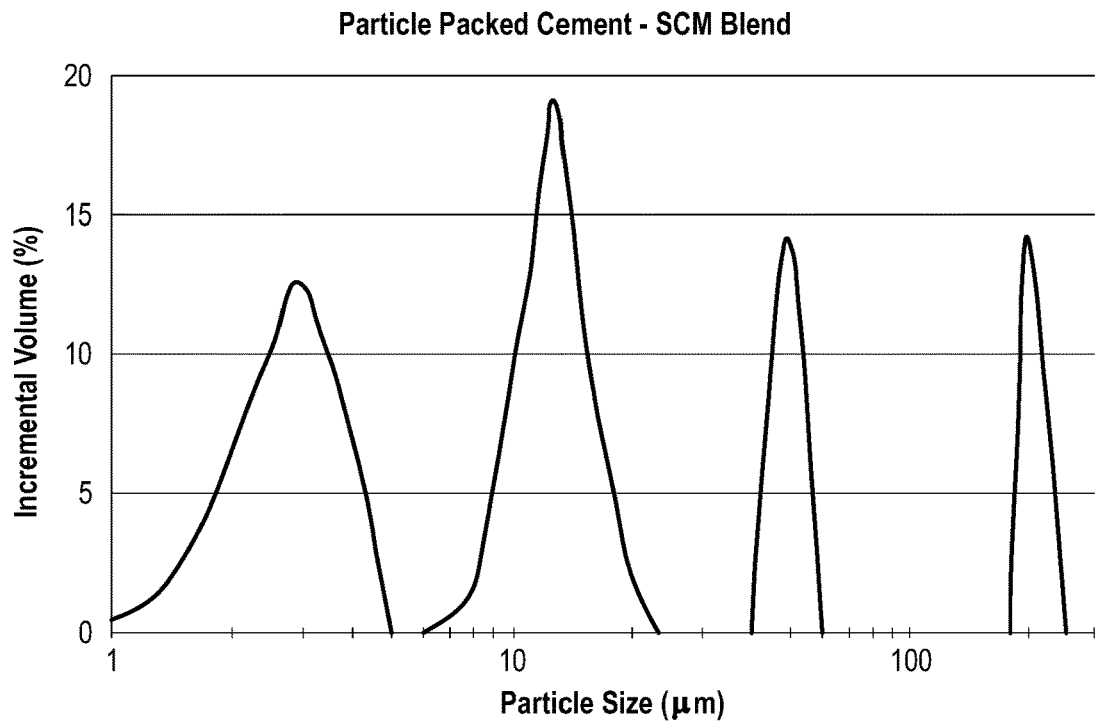

FIG. 3D schematically illustrates an example quaternary blend in which there is no overlap between adjacent fractions and a gap between first and second coarse SCM fractions. The MPS multiple between adjacent fractions is 3.0 or greater. FIG. 3E schematically illustrates another example quaternary blend in which there are gaps between all adjacent fractions and the MPS multiple between adjacent fractions is even greater.

In one embodiment, a binary cement-SCM blend includes a narrow PSD cement as described herein and a single SCM fraction having a mean particle size (MPS) (e.g., d50) that differs from the MPS (e.g., d50) of the narrow PSD cement fraction by a multiple of at least 3.0, 3.25, 3.5, 3.75, 4, 4.25, 4.5, 5, 5.5 or 6 (e.g., a multiple ranging from 3.0-10, 3.25-8 or 3.5-6). In one embodiment, the single SCM fraction comprises a coarse SCM fraction with an MPS at least 3.0 times, 3.25 times, 3.5 times, 3.75 times, 4 times, 4.25 times, 4.5 times, 5 times, 5.5 times or 6 times the MPS of the narrow PSD cement. In another embodiment, the single SCM fraction comprises a fine SCM such that the MPS of the narrow PSD cement is at least 3.0 times, 3.25 times, 3.5 times, 3.75 times, 4 times, 4.25 times, 4.5 times, 5 times, 5.5 times or 6 times the MPS of the single SCM fraction. In some embodiments, there may be no overlap in the PSDs of the cement and SCM fractions. Some overlap may be permitted so long as the MPS of the cement and SCM fractions are sufficiently different so that the overall blend has a high PPD (e.g., at least 57.0%). Binary cement-SCM blends may be suitable for use by themselves or may benefit from blending with one or more additional SCMs to form a ternary or quaternary blend.

In another embodiment, a ternary cement-SCM blend includes narrow PSD cement and first and second SCM fractions. The first SCM fraction can be a coarse SCM having an MPS (e.g., d50) that is at least 3.0 times, 3.25 times, 3.5 times, 3.75 times, 4 times, 4.25 times, 4.5 times, 5 times, 5.5 times, or 6 times (e.g., ranging from 3.0-10, 3.25-8 or 3.5-6 times) the MPS (e.g., d50) of the narrow PSD cement. The second SCM fraction can be a fine SCM such that the MPS of the narrow PSD cement is at least 3.0 times, 3.25 times, 3.5 times, 3.75 times, 4 times, 4.25 times, 4.5 times, 5 times, 5.5 times or 6 times the MPS of the second SCM fraction.

In yet another embodiment, a quaternary cement-SCM blend may include a third SCM fraction that differs from the first and second SCM fractions. The third SCM fraction can simply be a different type of SCM with similar or overlapping PSD as the coarse SCM fraction and/or it may provide a fourth PSD that further enhances particle packing of the overall blend. For example, the first and second SCM fractions may comprise one or more types of pozzolan (e.g., fly ash, natural pozzolan, or slag), and the third SCM fraction may comprise a non-pozzolanic material (e.g., ground limestone or siliceous mineral). Alternatively, one or both of the first and second SCM fractions may comprise non-pozzolanic material(s) and the third SCM fraction may comprise pozzolan. In one embodiment, the MPS of the third SCM fraction (e.g., ultra-coarse SCM fraction) can be at least 3.0 times the MPS of the coarse SCM fraction. In yet another embodiment, the MPS of the third SCM fraction can be less than 3.0 times the MPS of the coarse SCM fraction.

FIGS. 4A through 8 illustrate examples of manufacturing systems for manufacturing a narrow PSD cement and/or one or more SCM fractions having a desired PSD. Such apparatus can be adapted to yield particulate blending materials as disclosed herein. Grinding apparatus and classifiers known in the art or modified to produce narrow PSD cement and particle packed cement-SCM blends may be used, e.g., ball mills, high pressure grinding rolls, vertical roller mills, rod mills, jet mills, Raymond mills, jaw crushers, hammer mills, high efficiency classifiers, sieves, and the like. Exemplary grinding and separation equipment is available from one or more of FLSmidth, Polysius, Pfeiffer or Loesche. In general, using more classifiers permits steeper particle size cutoffs and facilitates production of more precise PSDs for the cement and/or SCM fractions. In the event a reference number is not explicitly described it shall be understood as being the same as a similar reference number that is described in a different Figure.

The systems illustrated in FIGS. 4A-8 can be modified by adding or removing milling and/or classification equipment as needed. In some embodiment, only classifiers are used, such as where the source material has already been milled or otherwise has an acceptable PSD that needs no further modification to yield desired products. For example, fly ash as obtained from a power plant can be classified one or more times to yield two or more fractions of desired PSD. Any remaining fly ash fractions can be disposed of, milled to a finer PSD, used as a feed material to make cement clinker, water filtration, or as a filler in any number of known applications.

In some embodiments, a system for efficiently manufacturing particulate blending materials (PBMs) of different PSD for making particle size optimized cements, SCMs, blended cements and other cement-SCM compositions comprises: (1) one or more air classifiers, and optionally one or more mills, configured to process an initial PBM (e.g., cement and/or SCM) having an initial PSD (e.g., an initial d10 and an initial d90) and yield a plurality of PBM fractions with varying PSDs (e.g., varying d10 and/or d90); (2) a first storage vessel configured to store a first PBM fraction produced by the one or more air classifiers, and optionally one or more mills, having a first PSD that differs from the initial PSD (e.g., a first d90 less than the initial d90); and (3) a second storage vessel configured to store a second PBM fraction produced by the one or more air classifiers, and optionally one or more mills, having a second PSD that differs from the initial PSD and the first PSD (e.g., a second d10 greater than the initial d10 and a d90 greater than the first d90).

In some embodiments, a system for efficiently manufacturing particle size optimized cement-SCM blends comprises: (1) one or more air classifiers, and optionally one or more grinding mills, configured to process a particulate blending material (PBM) having an initial particle size distribution (PSD) (e.g., an initial d10 and an initial d90) and yield a plurality of PBM fractions; (2) a first blending apparatus configured to blend a first PBM fraction processed by the one or more air classifiers, and optionally the one or more mills, with one or more cements and/or SCMs and produce a first cement-SCM blend; and (3) a second blending apparatus configured to blend a second PBM fraction processed by the one or more air classifiers, and optionally the one or more mills, with one or more one or more cements and/or SCMs and produce a second cement-SCM blend.

Figure 4A:
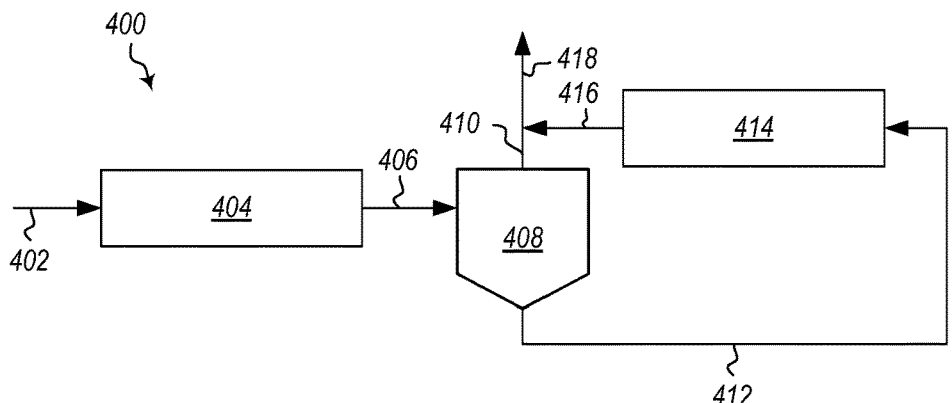

FIG. 4A illustrates a manufacturing system 400 for processing material 402 and includes first mill 404 to produce first ground material 406, which is sent to separator 408 to produce fine fraction 410 and coarse fraction 412, which is reground in second mill 414. Reground material 416 is combined with fine fraction 410 to yield product 418.

Figure 4B:
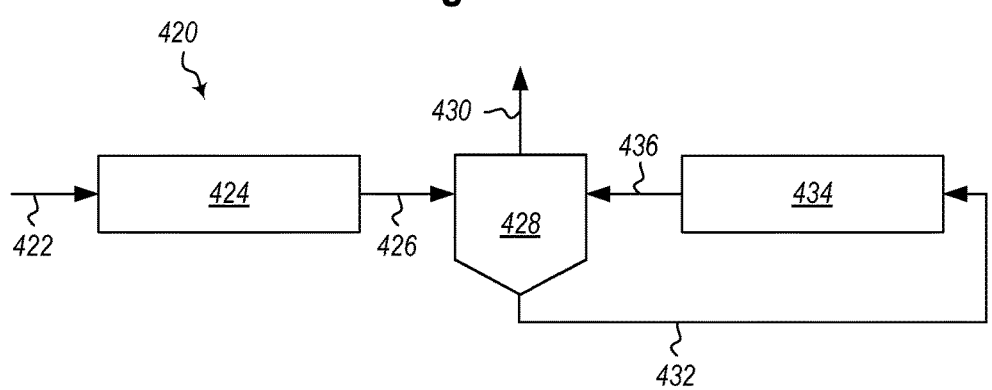

FIG. 4B illustrates a manufacturing system 420 for processing material 422 and includes first mill 424 to produce first ground material 426, which is sent to separator 428 to produce product 430 and coarse fraction 432, which is reground in second mill 434. Reground material 436 is introduced into separator 428 and contributes to final product 430.

Figure 4C:
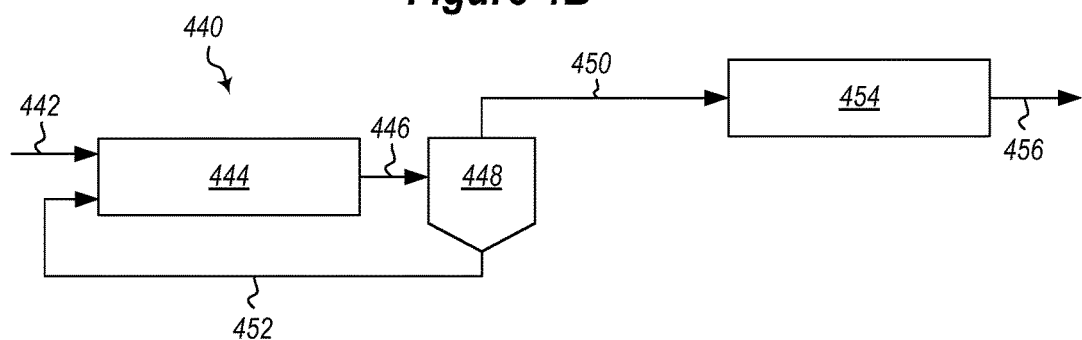

FIG. 4C illustrates a manufacturing system 440 for processing material 442 includes first mill 424 to produce ground material 446, which is sent to separator 448. Coarse material 452 is recycled back to first mill 444 to form a coarse grinding circuit. Fine material 450 is reground in second mill 454 to yield product 456.

Figure 4D:
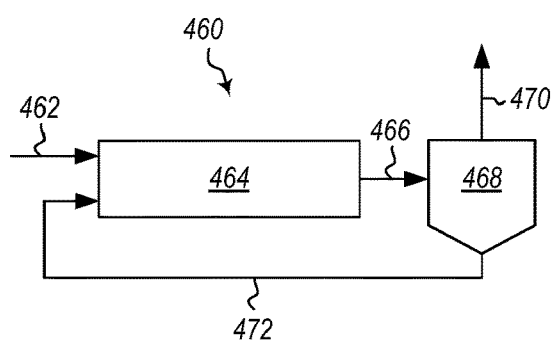

FIG. 4D illustrates a manufacturing system 460 for processing material 462 that includes single mill 464, which yields ground material 466, and single separator 468, which produces product stream 470 and a coarse fraction 472, which is returned to mill 464.

Figure 5A:
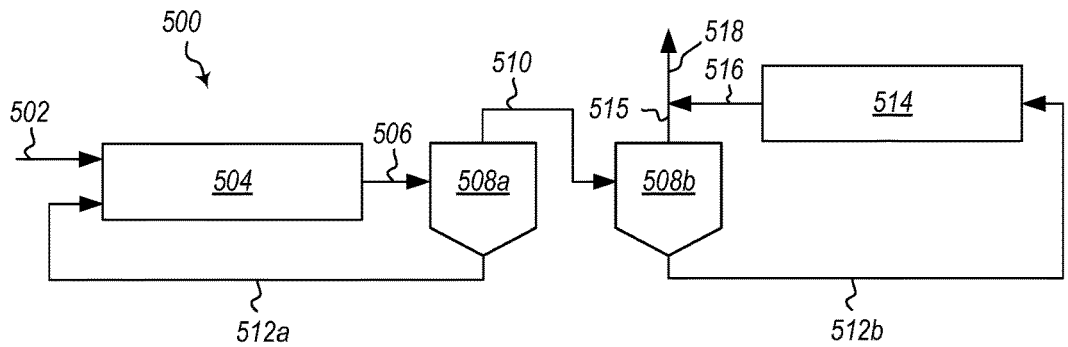
FIGS. 5A-5D schematically illustrate example two classifier milling and classification systems for manufacturing a PBM of desired PSD.

FIG. 5A illustrates a manufacturing system 500 for processing material 502 that includes a coarse grinding circuit consisting of coarse mill 504 that produces ground material 506 and first separator 508a, which produces first coarse fraction 512a, which is returned to coarse mill 504 for regrinding, and a first fine fraction 510, which is fed into second separator 508b. Second separator 508b produces fine fraction 515 and coarse fraction 512b, which is fed into fine mill 514 to produce reground material 516, which is combined with fine fraction 515 to yield product 518.

Figure 5B:
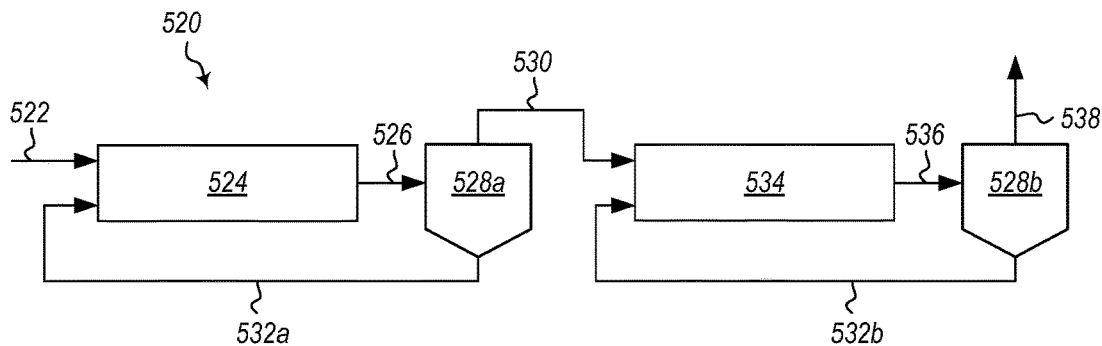

FIG. 5B illustrates a manufacturing system 520 which differs from system 500 in that it includes separate coarse and fine grinding circuits for processing material 522. The coarse grinding circuit includes coarse mill 524 that produces first ground material 526, first separator 528a that produces finer fraction 530 and coarser fraction 532a, which is recycled back to coarse mill 524. The fine grinding circuit includes fine mill 534 that produces reground material 536, second classifier 528b that produces product 538, and second coarse fraction 532b, which is recycled back to fine mill 534.

Figure 5C:
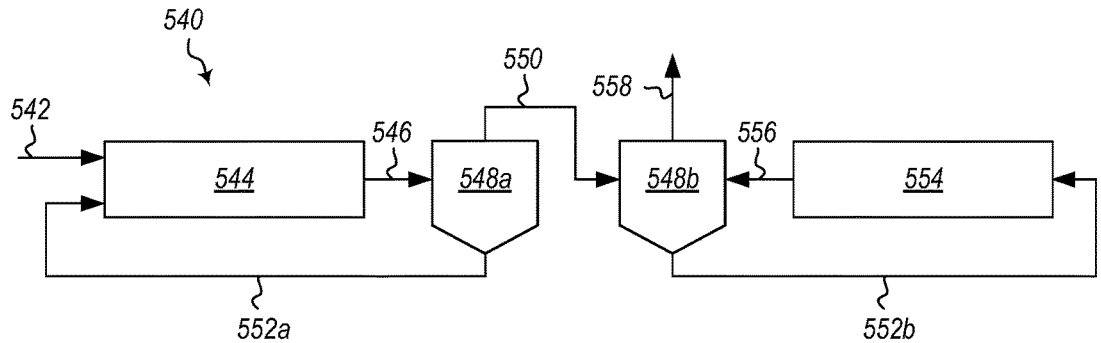

FIG. 5C illustrates system 540, which differs from system 520 of FIG. 5B in that second separator 548b is used to double classify initial ground material 546 and blend first fine material 550 and reground fine material 556 to yield product 558.

Figure 5D:
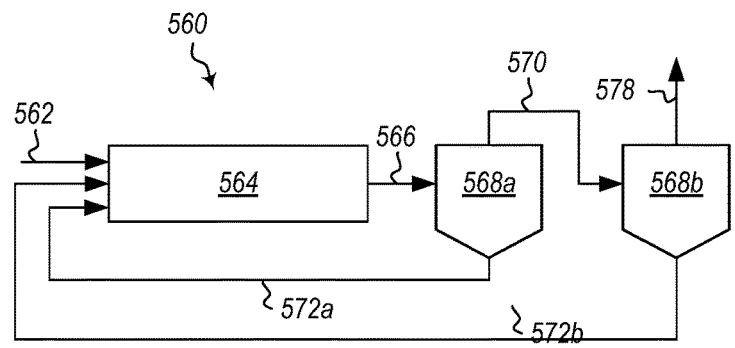

FIG. 5D illustrates system 560, which differs from systems 500, 520 and 540 by only including a single grinding apparatus 564 but two separation apparatus 568a and 568b (as may be integrated within a vertical roller mill with the initial separator around a perimeter of the grinding table and a single integrated high efficiency classifier). Coarse fractions 572a, 572b are reground by mill 564.

Figure 6A:
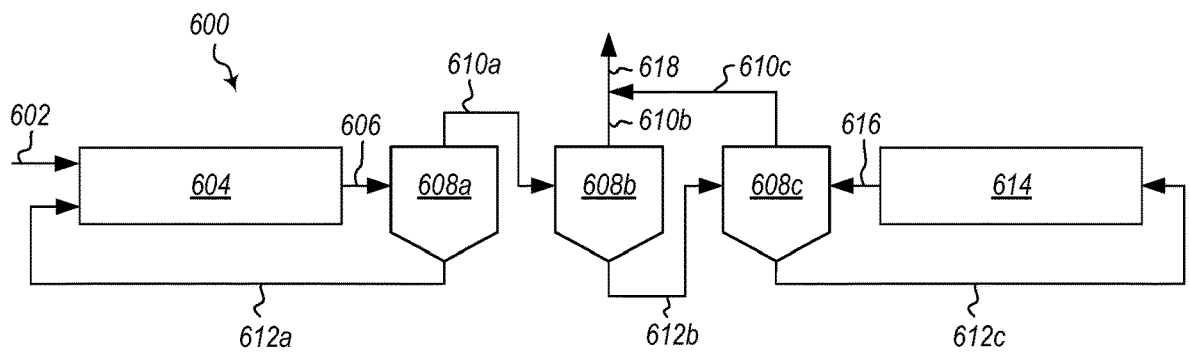
FIGS. 6A-6F schematically illustrate example three classifier milling and classification systems for manufacturing a PBM of desired PSD.
Figure 6B:
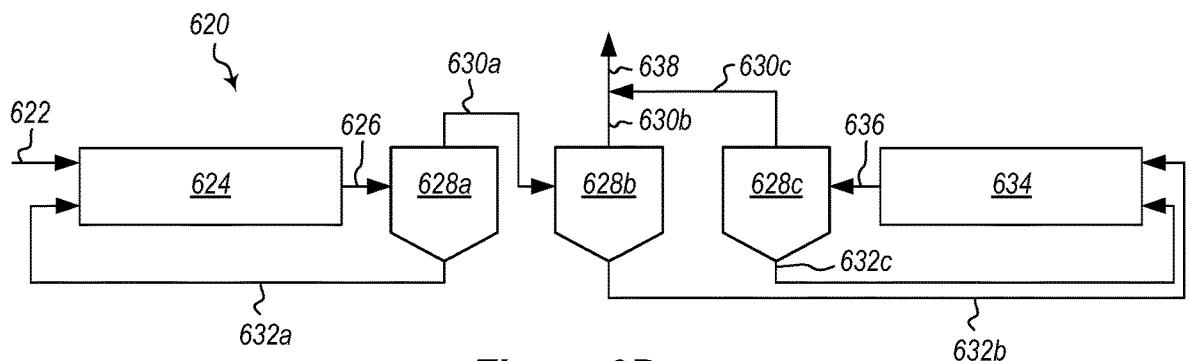

FIG. 6A illustrates a manufacturing system 600 for processing material 602 that includes a coarse grinding circuit consisting of coarse mill 604 and first separator 608a, which produces first coarse fraction 612a, recycled back into coarse mill 604 for regrinding and first fine fraction 610a, fed into second separator 608b. Second separator 608b produces second fine fraction 610b and second coarse fraction 612b, which is fed into third classifier 608c, part of a fine grinding circuit that includes fine mill 614. Reground material 616 from fine mill 614 is fed into third separator 608c, which produces third fine fraction 610c, which is combined with second fine fraction 610b to yield product 618. FIG. 6B illustrates system 620 that differs from system 600 in that the second course fraction 632b is fed into fine mill 634 rather than third classifier 628a.

Figure 6C:
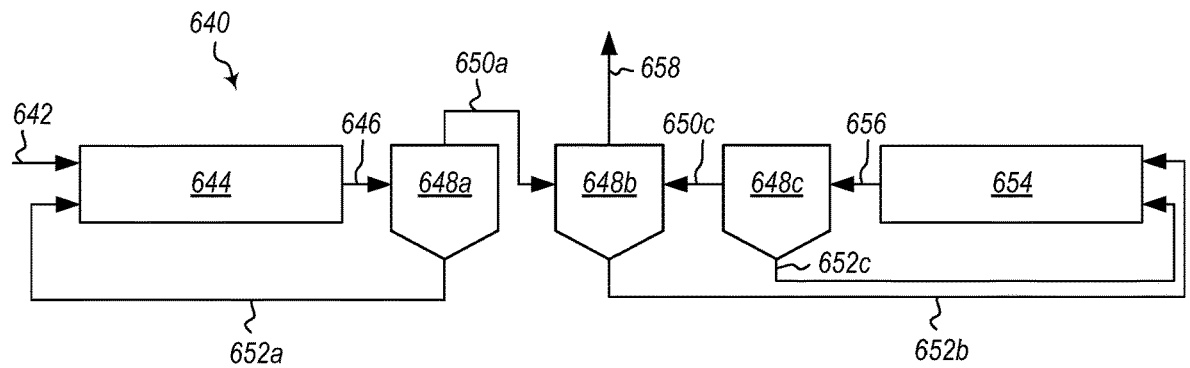
Figure 6D:
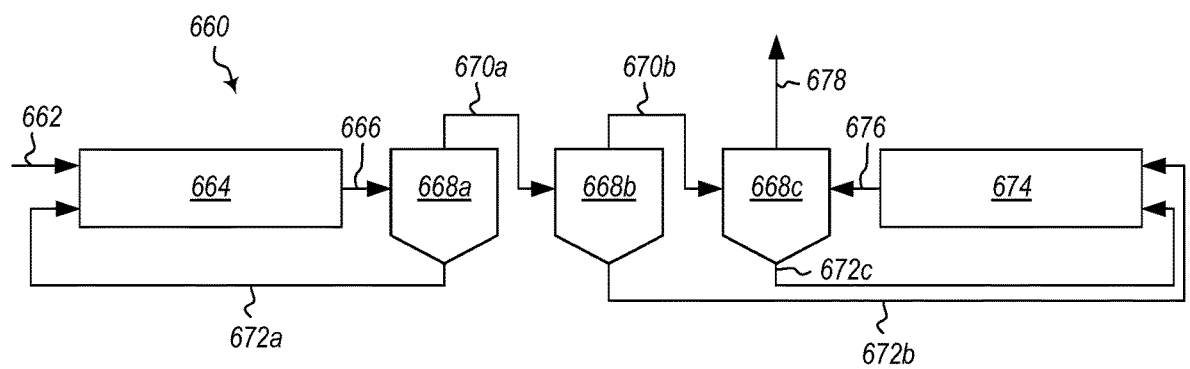
Figure 6E:
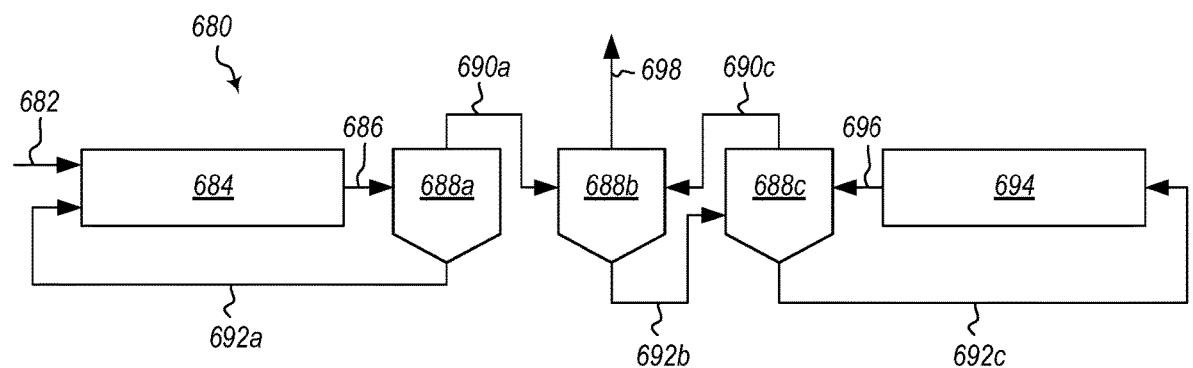
Figure 6F:
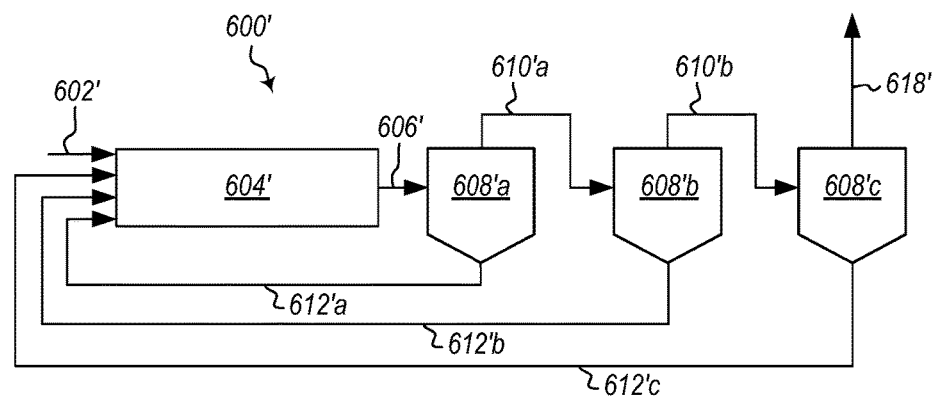

FIGS. 6C-6E illustrate manufacturing systems 640, 660, 680 which differ from systems 600, 620 in that the product is produced by blending products from the coarse and fine milling circuits in a single classifier. FIG. 6F illustrates manufacturing system 600' for processing material 602' which includes single grinding mill 604' coupled with three separators 608'a, 608'b, 608'c arranged in series to provide triple classification of ground material 606', with first, second and third coarse fractions 612'a, 612'b, and 612'c recycled back to mill 604'. For example, a VRM modified to include two high efficiency classifiers coupled with the initial separator around the perimeter of the grinding table can provide triple classification as shown in FIG. 6F.

Figure 7A:
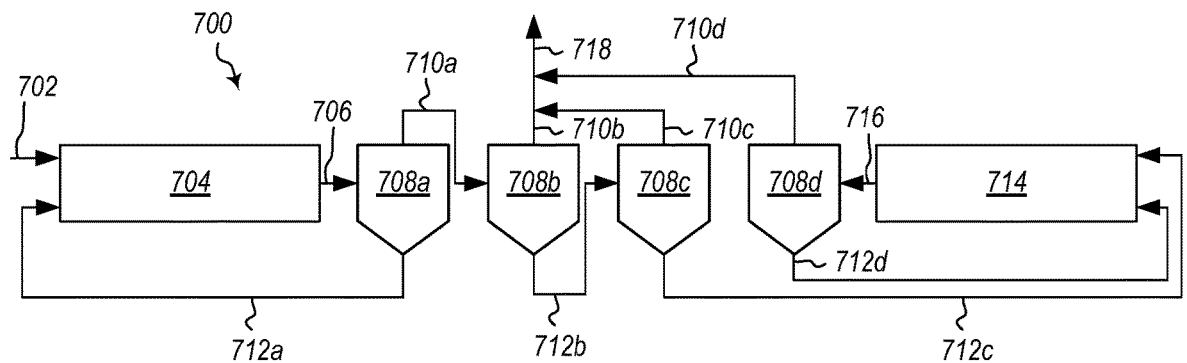
FIGS. 7A-7E schematically depict example four classifier milling and classification systems for manufacturing a PBM of desired PSD.

FIG. 7A illustrates a manufacturing system 700 for processing material 702 that includes a coarse grinding circuit consisting of coarse mill 704 and first classifier 708a, which produces first coarse fraction 712a, is recycled back to coarse mill 704, and first fine fraction 710a, fed into second classifier 708b. Second classifier 708b produces second fine 710b fraction and second coarse fraction 712b, fed into third classifier 708c to remove fines, which provide third fine fraction 710c, and yield third coarse fraction 712c, which is fed into fine mill 714 of a fine grinding circuit that includes fourth classifier 708d to classify reground material 716. Fourth fine fraction 710d is combined with second and third fine fractions 710b, 710c to yield product 718. Fourth coarse fraction 712d is recycled back into fine mill 714.

Figure 7B:
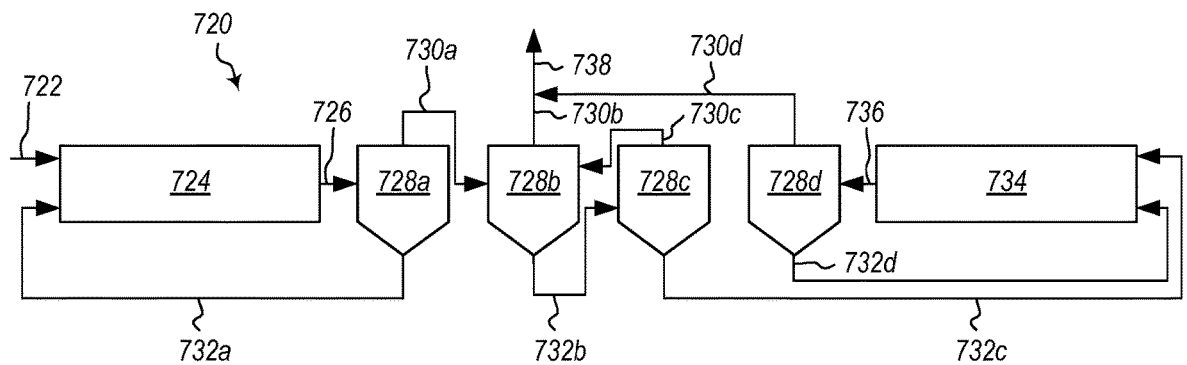
Figure 7C:
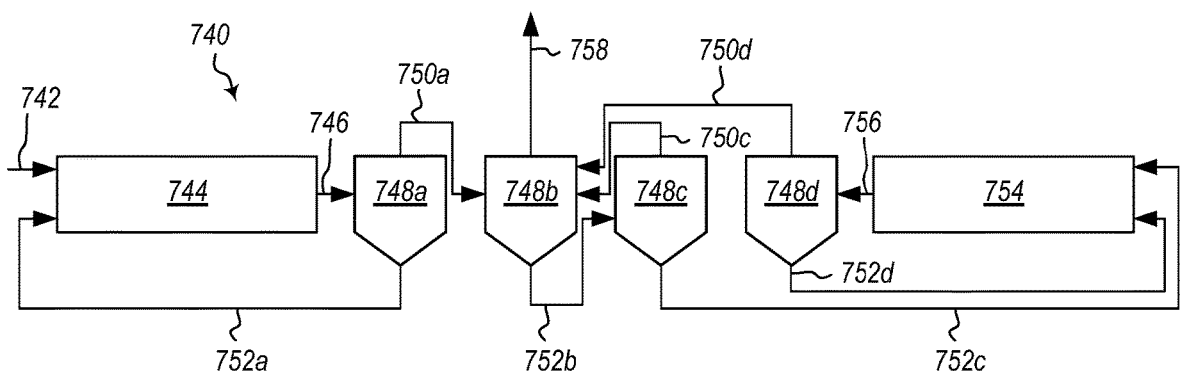
Figure 7D:
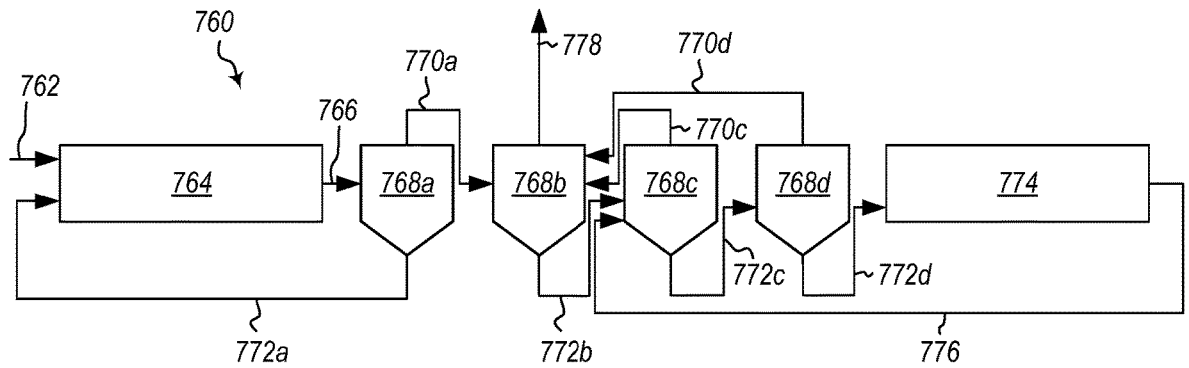

FIG. 7B illustrates a manufacturing system 720 that differs from system 700 in that third fine fraction 730c is fed into second classifier 728b for mixing with second fine fraction 730b to produce a stream that is blended with fourth fine fraction 730d to yield product 738. FIG. 7C illustrates system 740 that differs from systems 700 and 720 in that both third and fourth fine fractions 750c, 750d are fed into second classifier 748b for mixing with second fine fraction 750b to yield product 758. FIG. 7D illustrates 760 that provides double classification for both the coarse and fine grinding circuits and utilizes second classifier 768b to produce final product 778.

Figure 7E:
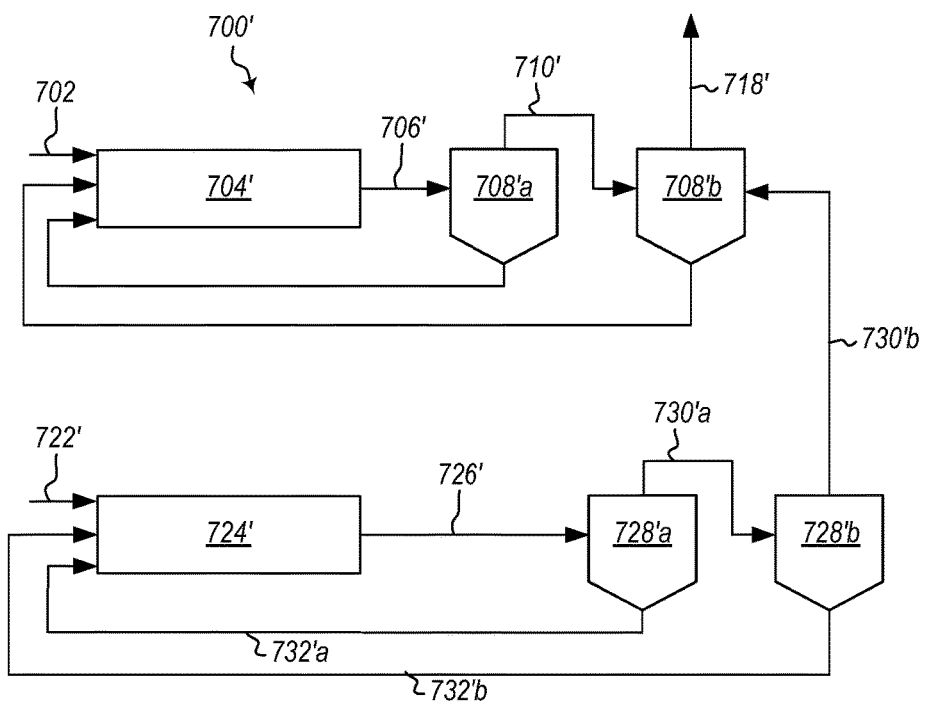

FIG. 7E illustrates system 700' for separately processing first material 702 and second material 702' and then combining the resultant materials to produce combined blended stream 718'. First material 702 is processed by first grinding apparatus 704' to produce first initial ground product 706', fed into serially arranged separators 708'a, 708'b, with first coarse fractions 712'a, 712'b being recycled back to first grinding apparatus 704'. Second material 702' is processed by second mill 724' to produce second initial ground product 726', which is fed into serially arranged separators 728'a, 728'b, with second coarse fractions 732'a, 732'b being recycled back to second grinding apparatus 724'. Second processed material 730'b is fed into classifier 708'b and combined with a first processed material to yield final blended product 718'.

Figure 8:
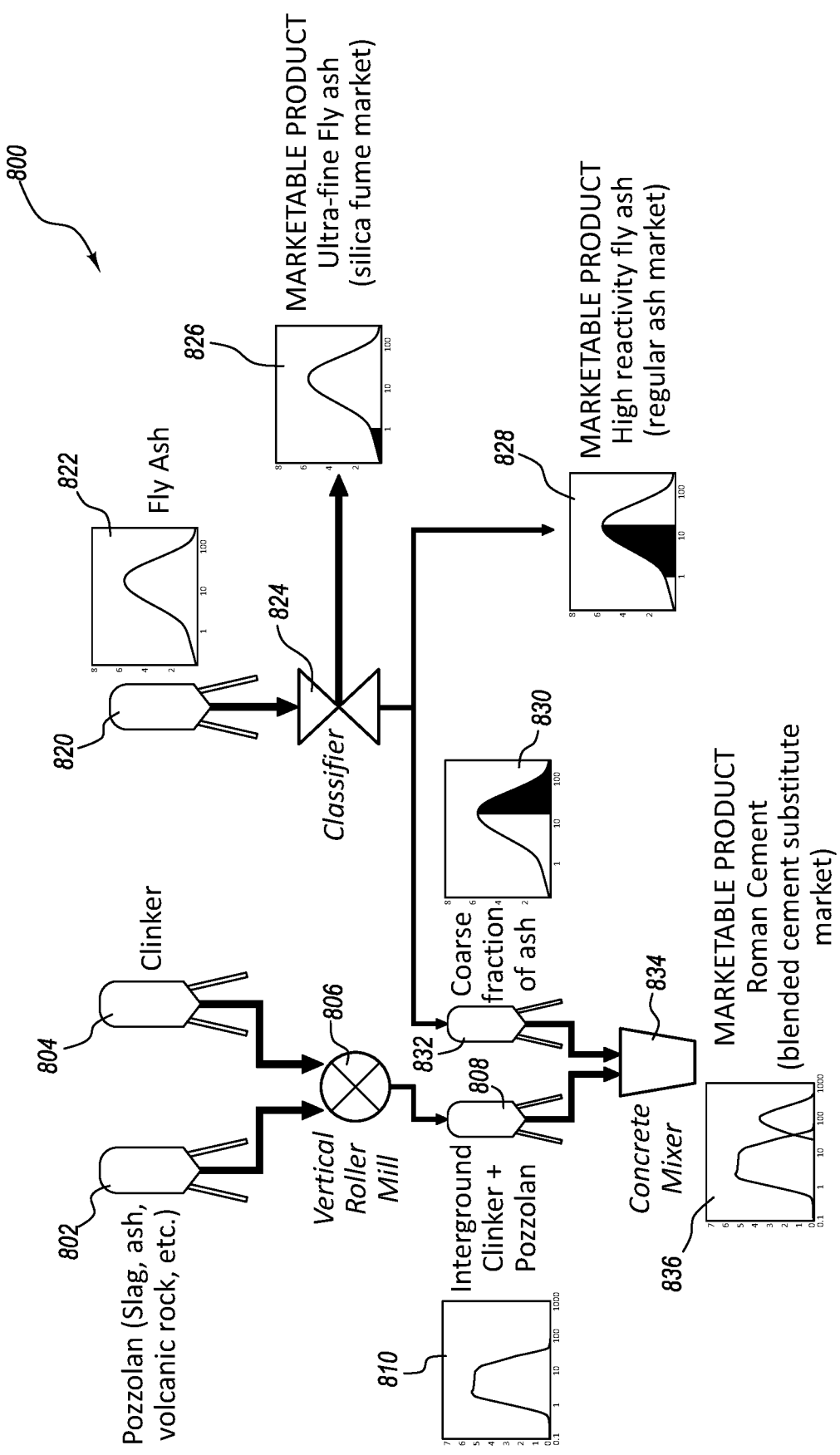
FIG. 8 schematically illustrates an exemplary system for manufacturing cement-SCM compositions, including a subsystem for classifying fly ash into multiple fractions with different PSDs, and a subsystem for intergrinding clinker and one or SCMs to yield an interground cement-SCM blend, which can be blended with a fly ash fraction.

FIG. 8 illustrates an example system for manufacturing cement-SCM compositions, including a sub-system for classifying fly ash into multiple fractions with PSDs, and a subsystem for intergrinding clinker and one or SCMs to yield an interground cement-SCM blend that can be blended with a fly ash fraction (e.g., coarse fraction). In the subsystem for classifying fly ash, a source fly ash is classified one or more times to yield a plurality (e.g., 2 or 3) product fractions of altered PSD. As illustrated, in one embodiment, an ultrafine fly ash fraction, fine fly ash fraction, and coarse fly ash fraction are made from the source fly ash. An example PSD for each of these materials is also illustrated. The ultrafine fly ash can have a D90 of less than 10 μm, 9 μm, 8 μm, 7 μm, 6 μm, 5 μm, 4 μm, 3 μm, 2 μm, or 1 μm to yield a micro silica product. The fine fly ash can have a D90 between 10-40 μm, 11-35 μm, 12-30 μm, 13-25 μm, or 14-22 μm and a D10 that is similar to the D90 of the ultrafine fly ash. The coarse fly ash can have a D10 similar to the D90 of the fine fly ash fraction and a D90 similar to or somewhat higher than the D90 of the source fly ash.

In an alternative embodiment, fine and coarse fly ash fractions are produced. Either of these can be further classified to yield two or more additional products of desired PSD. For example, fine and coarse fly ash with a cutoff between about 15-25 μm (e.g., 20 μm). A fine fly ash can have a desired D90 similar to a desired D10 of the coarse fly ash (e.g., 15-25 μm, or 20 μm). The fine fly ash can be further classified to yield ultrafine fly ash of desired D90. Any number of permutations are possible to yield multiple fly ash fractions of desired PSD for a particular purpose. It is possible to modify a fly ash of substandard quality to yield an acceptable or even superior SCM of high value by classification. The coarse leftover material of presumed low quality and low cost can be used for any number of purposes as disclosed herein.

Any of the fly ash fractions can be blended with any other cement or blended cement, including an interground cement-SCM material made using the other subsystem shown in FIG. 8. In that subsystem, one or more SCMs is interground and blended with clinker using a mill (e.g., VRM) to yield an interground clinker and SCM material of desired PSD. If the PSD is characteristic of a cement of medium to high fineness, it may be appropriate to blend this material with a coarse SCM, such as coarse fly ash from the other sub-system, with a complementary PSD, as illustrated in the PSD chart for this blend.

According to one embodiment, a VRM, high pressure grinding roll, or jaw crusher is used to make the narrow PSD cement and/or one or more SCM fractions. Such mills may include a grinding bed and one or more high efficiency classifiers in series. A roller mill is configured to have a comminution profile, material residence time, and classifier efficiency to produce narrow PSD cement. The roller mill has components and operating parameters selected to produce narrow PSD cement with minimal ultrafine particles and substantially fewer coarse particles as compared to conventional OPC. By way of example, components and operating parameters of a VRM selected to produce narrow PSD cement include one or more of dam ring height, mass air flow, inner recirculation rate, outer recirculation rate, air velocity and/or volume, classifier cut point, classifier capacity, classifier separation efficiency, grinding bed pressure, roller width, roller diameter, roller spacing, table speed, table geometry, roller geometry, material feed rate, grinding aid, and the like.

Cement-SCM Blends

Cement-SCM blends can be used in place of OPC, site blends of OPC and SCM, interground blends, and other cements known in the art. They can be used as sole or supplemental binder to make concrete, ready mix concrete, bagged concrete, bagged cement, mortar, bagged mortar, grout, bagged grout, molding compositions, or other fresh or dry cementitious compositions known in the art. Cement-SCM blends can be used to manufacture concrete and other cementitious compositions that include a hydraulic cement binder, water and aggregate, such as fine and coarse aggregates. Mortar typically includes cement, water, sand, and lime and is sufficiently stiff to support the weight of a brick or concrete block. Oil well cement refers to cementitious compositions continuously blended and pumped into a well bore. Grout is used to fill in spaces, such as cracks or crevices in concrete structures, spaces between structural objects, and spaces between tiles. Molding compositions are used to manufacture molded or cast objects, such as pots, troughs, posts, walls, floors, fountains, ornamental stone, and the like.

Water is both a reactant and rheology modifier that permits a fresh cementitious composition to flow or be molded into a desired configuration. Hydraulic cement reacts with water, binds the other solid components together, and is most responsible for early strength development and can contribute to later strength development. Blends with high PPD have reduced void space, which reduces water demand and increases workability for a given quantity of water.

Cement-SCM blends can be dry-blended or formed in situ when making a fresh cementitious composition containing water and aggregate. Cement-SCM blends include binary, ternary, quaternary blend, and other blends. In some embodiments, at least one SCM fraction is blended with at least one hydraulic cement fraction. In some embodiments cement-SCM blends may include one or more chemical additives that affect the chemistry of the aqueous solution, such as accelerating, retarding, and/or water-reducing admixtures.

Binary, ternary and quaternary blends may include a cement fraction, one or more SCM fractions, and lime, including quicklime (CaO) and/or hydrated lime ($Ca(OH)_2$). Although quicklime is more soluble than hydrated lime, when exposed to water quicklime is converted to hydrated lime. Therefore, the solubility of hydrated lime, or calcium hydroxide, in water is the limiting factor. The solubility of calcium hydroxide in water is reportedly 0.189 g/100 mL at 0° C., 0.173 g/100 mL at 20° C., and only 0.066 g/100 mL at 100° C. The temperature of concrete when hydrating is usually above 20° C. and below 100° C. Therefore, the solubility is somewhere between 0.173 g/100 mL and 0.066 g/100 mL, and it changes with increased temperature. In general, hydrated lime (e.g., Type S lime) is readily available and easier and safer to handle than quicklime. Hydrated lime also does not consume water when mixed into a cementitious composition and therefore does not affect water demand as much as quicklime. Quicklime may form either smaller or larger particles of hydrated lime when blended into water depending on how it is mixed and how fast it reacts to form calcium hydroxide. More vigorous mixing when initially added should yield finer particles. Slower mixing should yield larger particles. It has been found that hydrated lime typically works more predictably than quicklime, with similar or even superior results from the standpoint of early and late strength development.

In some embodiments, the amount of added lime is below, at or above the amount required to achieve or maintain saturation in water. The amount of lime required to maintain a saturated pore solution is dependent on factors such as the amount of free lime released from the hydraulic cement during hydration, the amount of lime consumed during cement hydration and the pozzolanic reaction, and the solubility of lime, which decreases with increased temperature. Increased temperature may accelerate consumption of lime. Using a more reactive pozzolan may deplete lime faster than a less reactive pozzolan. The ideal amount of added lime is that amount that maintains a pore solution saturated with calcium ions over time in conjunction with lime being released from the cement. A slight excess of lime can be added as a reservoir to provide additional lime as some of it is depleted.

In some embodiments, the amount of added lime is 1-10 times, or 1.2-8 times, or 1.5-5 times the amount required to achieve saturation on the amount of added water. One purpose of the added lime is to maintain the pore solution at a pH similar to the pH when using OPC alone. Some SCMs, including fly ash and, in particular, ultrafine fly ash (UFFA), can deplete calcium ions and lower pH of the pore solution, which can retard hydration, including cement hydration and/or the pozzolanic reaction. Adding supplemental lime helps maintain a high pH characteristic of normal cement hydration. Because lime does not otherwise contribute to concrete strength but can actually weaken it, it has been found that using a relatively small amount of supplemental lime works better than using either no added lime or too much added lime. In some embodiments, the amount of supplemental lime based on the total weight of cementitious binder (cement and SCM) can be about 0.1% to about 10%, or about 0.2% to about 8%, or about 0.3% to about 6%, or about 0.4% to about 4%, or about 0.45% to about 3%, or about 0.5% to about 2.5%, or about 0.6% to about 2%, or about 0.65% to about 1.5% (e.g., 1%).

Limestone powder can be used in addition to or instead of lime to increase strength development. While calcium carbonate has substantially lower solubility than lime (only 0.013 g/L at 25°), it can still contribute some quantity of calcium ions. It can also provide nucleation sites for the formation of cement hydration products, mainly calcium silicate hydrates, calcium aluminate hydrates, calcium carboaluminates, and calcium carboaluminoferrites, and the like. Where the SCM contains soluble aluminates that can deplete sulfate and alter the sulfate balance of the hydraulic cement, the use of limestone can partially or entirely mitigate the sulfate imbalance due to the formation of calcium carboaluminates.

Where limestone is not used or where it is otherwise desired to raise the quantity of sulfate in the cement binder system, supplemental sulfate can added, such as calcium sulfate hemihydrate (Plaster of Paris), calcium sulfate dihydrate (gypsum), and alkali metal sulfates. When used, the amount of supplemental sulfate based on the total weight of cementitious binder (cement and SCM) can be about 0.1% to about 10%, or about 0.2% to about 8%, or about 0.3% to about 6%, or about 0.4% to about 4%, or about 0.45% to about 3%, or about 0.5% to about 2.5%, or about 0.6% to about 2%, or about 0.65% to about 1.5% (e.g., 1%).

EXAMPLES

Example 1

A commercially available fly ash was classified into coarse and fine fractions. The coarse fly ash fraction had a d90 of about 100 µm and a d10 of about 20 µm. The fine fly ash fraction had a d90 of about 20 µm and a d10 of about 1.6 µm. The coarse fly ash fraction was used to make binary and ternary blended cements as described herein. In some embodiments, the coarse fly ash fraction was blended with a fine cement to make binary blends. In other embodiments, the coarse fly ash fraction was blended with a narrow PSD cement and a fine SCM to make ternary blends. Such blended cements were tested according to ASTM C109 and found to have similar or better strength than 100% OPC made from the same cement clinker and superior strength compared to traditional blended cements made using the OPC and traditional SCMs that were not particle size optimized. This was particularly true at lower w/cm, which indicates that the particle size optimization approach disclosed herein can provide an even greater benefit in high performance cements made at lower w/cm. Such blended cements were also tested in concrete using concrete cylinders and found to have similar or better strength than 100% OPC made from the same cement clinker and superior strength compared to traditional blended cements made using the OPC and traditional SCMs that were not particle size optimized. This was particularly true at lower w/cm, which indicates that the particle size optimization approach disclosed herein can provide an even greater benefit in high performance concretes made at lower w/cm.

The fine fly ash fraction was used as a fine SCM fraction together with a narrow PSD cement and a coarse SCM fraction (e.g., an interground blend of volcanic ash and limestone having a d90 substantially greater than the d90 of the cement fraction).

Example 2

The fine fly ash fraction from Example 1 was further classified to form three additional fly ash materials, first and second ultrafine fly ash fractions having a target d90 of 5 µm and 10 µm, respectively, and a coarser leftover material. The first ultrafine fly ash fraction was used as an ultrafine SCM in a ternary blended cement tested according to ASTM C109 and found to perform far better than the regular unprocessed fly ash from which it was made and also the fine fraction of Example 1 in terms of early and late strength contributions. The ultrafine fly ash fraction was also blended with OPC as an approximate micro silica (e.g., silica fume) substitute and found to perform adequately in this capacity. Because silica fume typically costs 5-10 times more than OPC, producing fine and ultrafine fly ash fractions from a starting fly ash is a value added process. The "waste" coarse fly ash fraction was not wasted but was rather used as the coarse SCM fraction in binary and ternary blended cements. The coarse SCM fraction lowered the water demand compared to the fine cement by itself, increased particle packing, reduced shrinkage (autogenous and drying), and eventually reacted pozzolanically and contributed to higher long-term strength.

Examples 1 and 2 therefore demonstrate how a single fly ash material was fractionated into multiple useful SCM fractions and then used in different ways to make blended cements. The fine and ultrafine fly ash fractions were useful as fine and ultrafine SCM fractions in ternary blended cements. The coarse fraction was also useful, showing that every portion of a fly ash classified into multiple fractions of different PSD can be beneficially used. The net result is that the fly ash has higher total value when divided into fractions compared to the original fly ash.

Example 3

A fly ash of substandard quality (e.g., with a reactivity index below 75 and/or that contained excessive coarse carbon particles and/or that is otherwise landfilled and not used in concrete) from the Huntington, Utah power plant was classified into fine and coarse fractions. The fine fraction had a D90 of about 10.5 µm and a D90 of about 1.2 µm. It had a reactivity index above 75 and an LOI (loss on ignition) that indicates less than 6% carbon as required by ASTM C618. This suggests that classification is a beneficiation process that is able to make a commercially and technically acceptable fly ash from an unacceptable fly ash. A calorimetry test indicated some degree of set retardation when used with OPC at 40%. The coarse fly ash "waste" can be beneficially used as a coarse fraction in a binary or ternary blended cement and/or as a partial sand replacement and is able to increase particle packing density of the blended cement compared to the cement fraction by itself and at least partially mitigates autogenous shrinkage.

Example 4

A fly ash of substandard quality (e.g., with a reactivity index below 75 and/or that contained excessive coarse carbon particles and/or that is otherwise landfilled and not used in concrete) from the Hunter, Utah power plant was classified into fine and coarse fractions. The fine fraction had a D90 of about 7.5 µm and a D90 of about 1.1 µm. It had a reactivity index above 75 and an LOI (loss on ignition) that indicates less than 6% carbon as required by ASTM C618. This suggests that classification is a beneficiation process that is able to make a commercially and technically acceptable fly ash from an unacceptable fly ash. A calorimetry test indicated some degree of set retardation when used with OPC at 40%. The coarse fly ash "waste" can be beneficially used as a coarse fraction in a binary or ternary blended cement and/or as a partial sand replacement and is able to increase particle packing density of the blended cement compared to the cement fraction by itself and at least partially mitigates autogenous shrinkage.

Example 5

An attempt was made to classify a fly ash of standard quality from the Jim Bridger, Wyoming power plant into fine and coarse fractions. However, due to apparent agglomeration of the source material because of water, there was essentially no separation. The apparent "fine" fraction was tested and found to be substantially less reactive than the ultrafine fly ash materials made in Examples 3 and 4. Therefore, even though the source fly ash in this example is considered to be commercially acceptable and therefore superior to the source fly ashes in Examples 3 and 4, the result of classification yielded substantially superior products from the substandard fly ash sources compared to the standard fly ash product.

The fine fraction had a D90 of about 7.5 μm and a D90 of about 1.1 μm. It had a reactivity index above 75 and an LOI (loss on ignition) that indicates less than 6% carbon as required by ASTM C618. This suggests that classification is a beneficiation process that is able to make a commercially and technically acceptable fly ash from an unacceptable fly ash. A calorimetry test indicated some degree of set retardation when used with OPC at 40%. The coarse fly ash "waste" can be beneficially used as a coarse fraction in a binary or ternary blended cement and/or as a partial sand replacement and is able to increase particle packing density of the blended cement compared to the cement fraction by itself and at least partially mitigates autogenous shrinkage.

Example 6

A fly ash of any quality is classified into fine and coarse fractions. The fine fraction is used as a silica fume substitute. The coarse fly ash "waste" is beneficially used as a coarse fraction in a binary or ternary blended cement and is able to increase particle packing density of the blended cement compared to the cement fraction by itself and at least partially mitigates autogenous shrinkage. In a ternary blended cement containing a high quantity of very fine GGBFS that is prone to high autogenous shrinkage, particularly at very low w/cm, the coarse fly ash particles at least partially mitigate such autogenous shrinkage and yields concrete that is less prone to shrinkage and cracking.

Example 7

A cement having a d90 between 20-30 μm and a d10 between 1-3 μm is classified into fine and narrow PSD fractions. The fine cement fraction has a d90 of 10-15 μm or below. The narrow PSD fraction has a d90 between about 22-35 μm and a d10 between about 3-8 μm. The fine cement fraction is blended with a coarse SCM to make a binary blended cement. Alternatively, it is used as a fine cement blending material for blending with OPC or making fine grout. The narrow PSD fraction is blended with fine and coarse SCM fractions to make a particle size optimized ternary blended cement of superior strength and other properties compared to traditional blends of same SCM substitution level.

Example 8

A steel slag ground to a d90 of 50-80 μm is classified into fine and coarse fractions.

The fine steel slag fraction is used as a fine SCM together with OPC or in making a ternary blend using a narrow PSD cement. The coarse steel slag fraction is beneficially used as a coarse fraction in a binary or ternary blended cement and is able to increase particle packing density of the blended cement compared to the cement fraction by itself and at least partially mitigates autogenous shrinkage. In a ternary blended cement containing a high quantity of very fine GGBFS that is prone to high autogenous shrinkage, particularly at very low w/cm, the coarse steel slag particles at least partially mitigate such autogenous shrinkage and yields concrete that is less prone to shrinkage and cracking.

Examples 9-14

Concrete mixes were made using a standard rotary concrete mixer obtained from Harbor Freight. Fresh concrete was cast into 4×8 inch cylinders and tested by CMT Engineering in West Valley City, Utah. The Portland cement was a Type I/II OPC manufactured by Holcim, Devil's Slide, Utah plant. The Class F fly ash was a standard fly ash obtained from Headwaters from a power plant in Alabama. The calcined shale was flue dust obtained from Utelite, Coalville, Utah. The quarry fines containing at least about 90% limestone in the form of calcite were purchased from Staker-Parson and produced in Genola, Utah at a limestone quarry. The coarse aggregate and fine aggregate were purchased from Staker-Parson and produced in North Salt Lake, Utah. The concrete mixes were based on a common "6-bag" concrete mix with a design strength at 28 days of 5200 psi. The concrete mixes are expressed in terms of the quantities required to make a cubic yard of concrete and are set forth in Table 1. Suitable lignosulfonate (Plastocrete 161) and/or polycarboxylate ether (Viscocrete 2100) were used in some cases to maintain desired slump between about 3-6 inches.

TABLE 1

| Components/ Compressive Strength | Example | | | | | |
|---|---|---|---|---|---|---|
| | 9 | 10 | 11 | 12 | 13 | 14 |
| Type I/II OPC (lb.) | 564 | 451.2 | 394.8 | 451.2 | 394.8 | 366.6 |
| Class F Fly Ash (lb.) | 0 | 112.8 | 169.2 | 0 | 0 | 84.6 |
| Calcined Shale (lb.) | 0 | 0 | 0 | 0 | 0 | 84.6 |
| Quarry Fines (lb.) | 0 | 0 | 0 | 112.8 | 169.2 | 141 |
| Type S Lime | 0 | 0 | 0 | 0 | 0 | 22.56 |
| Plaster of Paris | 0 | 0 | 0 | 0 | 0 | 5.64 |
| Course Aggregate (lb.) | 1750 | 1750 | 1750 | 1750 | 1750 | 1750 |
| Fine Aggregate (lb.) | 1372 | 1338 | 1320 | 1338 | 1320 | 1249 |
| Water (lb.) | 266.6 | 266.6 | 266.6 | 266.6 | 266.6 | 248.2 |
| w/cm | 0.47 | 0.47 | 0.47 | 0.47 | 0.47 | 0.44 |
| w/c | 0.47 | 0.59 | 0.675 | 0.59 | 0.675 | 0.677 |
| 3-day (psi) | 3850 | 3482 | 3050 | 3340 | 2980 | 2720 |
| 7-day (psi) | 4580 | 4097 | 3870 | 3670 | 3360 | 4350 |
| 28-day (psi) | 5690 | 5202 | 5010 | 4720 | 4000 | 6160 |
| 3-month (psi) | 6240 | 6135 | — | — | — | 7170 |

Examples 9-13 show the relative effects of using OPC, a binary blend of OPC and fly ash, and a binary blend of OPC and quarry fines. As expected, the quarry fines, being non-reactive, performed worse than fly ash. But when used in a ternary blend, as in Example 10E, the quarry fines boosted strength even though Example 14 had the lowest clinker content and highest absolute water-to-cement ratio, excluding SCMs (w/c=0.677).

Examples 15-20

Concrete mixes were made as above. The Portland cement was a Type I/II OPC manufactured by Holcim, Devil's Slide, Utah plant. The Class F fly ash was a standard fly ash obtained from Headwaters. The calcined shale was flue dust obtained from Utelite, Coalville, Utah. The quarry fines containing at least about 90% limestone in the form of calcite were purchased from Staker-Parson. The coarse aggregate and fine aggregate were purchased from Staker-Parson. The ultrafine fly ash (UFFA) was made by classifying a waste fly ash designated for landfill either from Huntington, Utah or Hunter, Utah power plant. The concrete mixes were based on a common "6-bag" concrete mix with a design strength at 28 days of 5200 psi. The concrete mixes are expressed in terms of the quantities required to make a cubic yard of concrete and are set forth in Table 2.

TABLE 2

| Components/ Compressive Strength | Example | | | | | |
|---|---|---|---|---|---|---|
| | 15 | 16 | 17 | 18 | 19 | 20 |
| Type I/II OPC (lb.) | 394.8 | 394.8 | 451.2 | 366.6 | 366.6 | 394.8 |
| Class F Fly Ash (lb.) | 84.6 | 0 | 0 | 0 | 0 | 0 |
| Calcined Shale (lb.) | 0 | 84.6 | 0 | 0 | 0 | 84.6 |
| UFFA (lb.) | 0 | 0 | 112.8 | 141 | 141 | 84.6 |
| Quarry Fines (lb.) | 163.6 | 163.6 | 0 | 101.5 | 101.5 | 56.4 |
| Type S Lime | 11.28 | 11.28 | 0 | 8.46 | 8.46 | 0 |
| Plaster of Paris | 5.64 | 5.64 | 0 | 2.82 | 2.82 | 0 |
| Coarse Aggregate (lb.) | 1650 | 1650 | 1750 | 1705 | 1705 | 1685 |
| Fine Aggregate (lb.) | 1302 | 1302 | 1338 | 1300 | 1304 | 1300 |
| Water (lb.) | 248.2 | 248.2 | 266.6 | 242.5 | 242.5 | 248.2 |
| w/cm | 0.44 | 0.44 | 0.473 | 0.43 | 0.43 | 0.44 |
| w/c | 0.63 | 0.63 | 0.59 | 0.66 | 0.66 | 0.63 |
| 3-day (psi) | 2950 | 3250 | 3010 | 2860 | 2960 | 3930 |
| 7-day (psi) | 3800 | 3960 | 4570 | 4490 | 4420 | 5670 |
| 28-day (psi) | 4850 | 5530 | 6480 | 6620 | 7390 | 7550 |
| 3-month (psi) | 6050 | 6620 | 7540 | 8310 | 8580 | 8290 |

As shown in Table 2, the concrete made using UFFA exhibited substantially superior strength at 28 days and 3 months.

Examples 21-26

Concrete mixes were made as above. The Portland cement was a Type I/II OPC manufactured by Holcim, Devil's Slide, Utah plant. The interground cement was made by intergrinding equal masses of clinker and natural pozzolan provided by Drake Cement, Paulden, Arizona to a D90 of 24 μin a bench scale vertical roller mill by Gebr. Pfeiffer, Kaiserslaughtern, Germany. Plaster of Paris was added for sulfate balance to provide 2.3% $SO_3$. The Class F fly ash was a standard fly ash obtained from Headwaters. The calcined shale was flue dust obtained from Utelite, Coalville, Utah. The quarry fines containing at least about 90% limestone in the form of calcite were purchased from Staker-Parson. The coarse aggregate and fine aggregate were purchased from Staker-Parson. The ultrafine fly ash (UFFA) was made by classifying a waste fly ash designated for landfill either from Huntington, Utah or Hunter, Utah power plant. The concrete mixes were based on a common "6-bag" concrete mix with a design strength at 28 days of 5200 psi. The concrete mixes are expressed in terms of the quantities required to make a cubic yard of concrete and are set forth in Table 3.

TABLE 3

| Components/ Compressive Strength | Example | | | | | |
|---|---|---|---|---|---|---|
| | 21 | 22 | 23 | 24 | 25 | 26 |
| Type I/II OPC (lb.) | 366.6 | 0 | 0 | 423 | 394.8 | 394.8 |
| Interground cement (lb.) | 0 | 540.85 | 721.13 | 0 | 0 | 0 |
| Class F Fly Ash (lb.) | 0 | 0 | 0 | 112.8 | 112.8 | 112.8 |
| Calcined Shale (lb.) | 50.8 | 0 | 0 | 0 | 0 | 0 |
| UFFA (lb.) | 141 | 0 | 0 | 0 | 0 | 0 |
| Coarse F ash (lb.) | 0 | 0 | 0 | 0 | 0 | 0 |
| Quarry Fines (lb.) | 56.4 | 112.8 | 112.8 | 84.6 | 112.8 | 107.2 |

TABLE 3-continued

| Components/Compressive Strength | Example | | | | | |
|---|---|---|---|---|---|---|
| | 21 | 22 | 23 | 24 | 25 | 26 |
| Plaster of Paris (lb.) | 0 | 23.4 | 30.87 | 0 | 0 | 0 |
| Type S Lime (lb.) | 5.64 | 11.28 | 11.28 | 5.64 | 0 | 5.64 |
| Coarse Aggregate (lb.) | 1687 | 1704 | 1600 | 1700 | 1720 | 1720 |
| Fine Aggregate (lb.) | 1300 | 1205 | 1175 | 1260 | 1260 | 1260 |
| Water (lb.) | 248.2 | 270.38 | 251.88 | 256.3 | 248.2 | 248.2 |
| w/cm | 0.44 | 0.47 | 0.33 | 0.45 | 0.44 | 0.44 |
| w/c | 0.68 | 0.94 | 0.66 | 0.61 | 0.63 | 0.63 |
| 3-day (psi) | 3280 | 3590 | 2390 | 3510 | 4320 | 4520 |
| 7-day (psi) | 5000 | 4620 | 4970 | 4310 | — | — |
| 28-day (psi) | 7600 | — | — | — | — | — |
| 3-month (psi) | 8530 | — | — | — | — | — |

As shown in Table 3, the concrete made using UFFA exhibited substantially superior strength at 28 days and 3 months. The concrete made with fine interground cement-pozzolan and quarry fines exhibited impressive strength given the low clinker content and relatively high water used in Example 22. Example 23 made at much lower water was retarded using citric acid (0.2% by weight of interground cement), which reduced early strength but might ultimately yield very high strength when the results come in. Blends made using regular fly ash and quarry fines showed good early strength. The use of hydrated lime in Example 26 boosted early strength compared to Example 25 of almost the same mix.

Examples 27-28

Concrete mixes were made as above. The Portland cement was a Type VII OPC manufactured by Holcim, Devil's Slide, Utah plant. The ultrafine fly ash (UFFA) was made by classifying a fly ash from either Huntington, Utah or Jim Bridger, Wyoming power plants. The Class F fly ash was a standard fly ash obtained from Headwaters. The quarry fines containing at least about 90% limestone in the form of calcite were purchased from Staker-Parson. The coarse aggregate and fine aggregate were purchased from Staker-Parson. The ultrafine fly ash (UFFA) was made by classifying fly ash from Jim Bridger, Wyoming power plant. The coarse fly ash was made according to Example 1. The concrete mixes are expressed in terms of the quantities required to make a cubic yard of concrete and are set forth in Table 4.

TABLE 4

| Components/Compressive Strength | Example | |
|---|---|---|
| | 27 | 28 |
| Type I/II OPC (lb.) | 317.3 | 317.3 |
| Class F Fly Ash (lb.) | 105.8 | 105.8 |
| UFFA (lb.) | 105.8 | 105.8 |
| Coarse F ash (lb.) | 268 | 162.2 |

TABLE 4-continued

| Components/Compressive Strength | Example | |
|---|---|---|
| | 27 | 28 |
| Quarry Fines (lb.) | 0 | 105.8 |
| Type S Lime (lb.) | 14.10 | 14.10 |
| Coarse Aggregate (lb.) | 1600 | 1600 |
| Fine Aggregate (lb.) | 1263 | 1263 |
| Water (lb.) | 211.5 | 211.5 |
| w/cm | 0.30 | 0.30 |
| w/c | 0.67 | 0.67 |
| 3-day (psi) | 2950 | 4030 |
| 7-day (psi) | 3790 | 5690 |
| 28-day (psi) | 6170 | 9210 |
| 3-month (psi) | 7110 | 10,280 |

As shown by comparing Examples 27 and 28, the use of quarry fines in place of some of the coarse fly ash greatly improved both early and late strengths.

Examples 29-54

Mortar mixes were made according to ASTM C109, but modified to include less water and more cement, using a Hobart mixer. Fresh mortar was cast into 2×2 inch cubes and tested by CMT Engineering in West Valley City, Utah. The Portland cement was a Type I/II OPC manufactured by Holcim, Devil's Slide, Utah plant. The ultrafine fly ash (UFFA) was made by classifying a fly ash from Huntington, Utah, Hunter, Utah, or Jim Bridger, Wyoming power plants. The silica fume was condensed silica fume provided by Calmetrix. The calcined shale was flue dust obtained from Utelite, Coalville, Utah. The Class F fly ash was a standard fly ash obtained from Headwaters from a power plant in Alabama. The quarry fines containing at least about 90% limestone in the form of calcite were purchased from Staker-Parson and produced in Genola, Utah at a limestone quarry. The sand was a standard silica sand. The mortar mixes are expressed in terms of the quantities required to make approximately 9 cubes and are set forth in Tables 5-10. Suitable lignosulfonate (Plastocrete 161) and/or polycarboxylate ether (Viscocrete 2100) were used in some cases to maintain flow between 100-120 on a flow table.

TABLE 5

| Components/Compressive Strength | Example | | | | | |
|---|---|---|---|---|---|---|
| | 29 | 30 | 31 | 32 | 33 | 34 |
| Type I/II OPC (g) | 920 | 782 | 782 | 782 | 782 | 782 |
| Class F Fly Ash (g) | 0 | 138 | 0 | 0 | 0 | 0 |
| Silica Fume (g) | 0 | 0 | 138 | 0 | 0 | 0 |

TABLE 5-continued

| Components/ Compressive Strength | Example | | | | | |
|---|---|---|---|---|---|---|
| | 29 | 30 | 31 | 32 | 33 | 34 |
| Bridger UFFA (g) | 0 | 0 | 0 | 138 | 0 | 0 |
| Hunter UFFA (g) | 0 | 0 | 0 | 0 | 138 | 0 |
| Huntington UFFA (g) | 0 | 0 | 0 | 0 | 0 | 138 |
| Silica Sand (g) | 1925 | 1883 | 1883 | 1883 | 1880 | 1851 |
| Water (g) | 322 | 322 | 322 | 322 | 322 | 322 |
| w/cm | 0.35 | 0.35 | 0.35 | 0.35 | 0.35 | 0.35 |
| 3-day (psi) | 8358 | 7135 | 7560 | 6630 | 6327 | 8045 |
| 7-day (psi) | 8770 | 8300 | 9687 | 8167 | 7690 | 8827 |
| 28-day (psi) | 11425 | 8895 | 12337 | 9192 | 8677 | 12920 |

TABLE 6

| Components/ Compressive Strength | Example | | | | | |
|---|---|---|---|---|---|---|
| | 35 | 36 | 37 | 38 | 39 | 40 |
| Type I/II OPC (g) | 782 | 782 | 782 | 782 | 782 | 782 |
| Bridger UFFA (g) | 138 | 138 | 138 | 138 | 0 | 0 |
| Headwaters UFFA (g) | 0 | 0 | 0 | 0 | 0 | 0 |
| Headwaters FFA (g) | 0 | 0 | 0 | 0 | 0 | 138 |
| Quarry Fines (g) | 0 | 0 | 138 | 138 | 138 | 138 |
| Quicklime (g) | 13.92 | 0 | 0 | 0 | 0 | 0 |
| Type S Lime (g) | 0 | 18.4 | 0 | 0 | 0 | 0 |
| Silica Sand (g) | 1851 | 1851 | 1622 | 1747 | 1747 | 1747 |
| Water (g) | 332.92 | 328.44 | 322 | 322 | 322 | 322 |
| w/cm | 0.35 | 0.35 | 0.35 | 0.35 | 0.35 | 0.35 |
| 3-day (psi) | 7202 | 7785 | 8067 | 8442 | 7712 | 6760 |
| 7-day (psi) | 8595 | 8165 | 9000 | 10075 | 9362 | 8375 |
| 28-day (psi) | 11035 | 10755 | 11387 | 10960 | 11477 | 10542 |

TABLE 7

| Components/ Compressive Strength | Example | | | | | |
|---|---|---|---|---|---|---|
| | 41 | 42 | 43 | 44 | 45 | 46 |
| Type I/II OPC (g) | 782 | 782 | 782 | 782 | 782 | 782 |
| Bridger UFFA (g) | 138 | 0 | 0 | 0 | 0 | 0 |
| Hunter UFFA (g) | 0 | 0 | 0 | 0 | 0 | 0 |
| Huntington UFFA (g) | 0 | 138 | 138 | 138 | 0 | 138 |
| Calcined Shale (g) | 0 | 0 | 0 | 0 | 138 | 138 |
| Quarry Fines (g) | 138 | 0 | 138 | 138 | 0 | 0 |
| Type S Lime (g) | 9.2 | 18.4 | 0 | 18.4 | 18.4 | 0 |
| Silica Sand (g) | 1722 | 1851 | 1747 | 1722 | 1851 | 1883 |
| Water (g) | 325.22 | 322 | 322 | 322 | 322 | 322 |
| w/cm | 0.35 | 0.35 | 0.35 | 0.35 | 0.35 | 0.35 |
| 3-day (psi) | 7935 | 8225 | 8212 | 7445 | 7145 | 4507 |
| 7-day (psi) | 10225 | 9570 | 8890 | 9080 | 8205 | 8235 |
| 28-day (psi) | 11750 | 10050 | 11295 | 11297 | 10247 | 10000 |

TABLE 8

| Components/ Compressive Strength | Example | | | | | |
|---|---|---|---|---|---|---|
| | 47 | 48 | 49 | 50 | 51 | 52 |
| Type I/II OPC (g) | 644 | 644 | 644 | 782 | 782 | 782 |
| Bridger UFFA (g) | 138 | 138 | 138 | 138 | 0 | 138 |
| Hunter UFFA (g) | 0 | 0 | 0 | 0 | 0 | 0 |
| Huntington UFFA (g) | 0 | 0 | 0 | 0 | 0 | 0 |
| Calcined Shale (g) | 138 | 138 | 138 | 0 | 138 | 0 |
| Quarry Fines (g) | 0 | 138 | 138 | 138 | 138 | 138 |
| Type S Lime (g) | 0 | 0 | 18.4 | 0 | 0 | 9.2 |

TABLE 8-continued

| Components/Compressive Strength | Example | | | | | |
|---|---|---|---|---|---|---|
| | 47 | 48 | 49 | 50 | 51 | 52 |
| Silica Sand (g) | 1841 | 1698 | 1678 | 1764 | 1764 | 1732 |
| Water (g) | 322 | 322 | 322 | 322 | 322 | 325.22 |
| w/cm | 0.35 | 0.35 | 0.35 | 0.35 | 0.35 | 0.35 |
| 3-day (psi) | 6020 | 6175 | 6670 | 8647 | 6877 | 8882 |
| 7-day (psi) | 7390 | 6922 | 7575 | 9695 | 8735 | 9535 |
| 28-day (psi) | 9120 | 8985 | 9985 | 11492 | 10455 | 10925 |

TABLE 9

| Components/Compressive Strength | Example | |
|---|---|---|
| | 53 | 54 |
| Type I/II OPC (g) | 782 | 644 |
| Huntington UFFA (g) | 138 | 0 |
| UF Steel Slag (g) | 0 | 138 |
| Quarry Fines (g) | 138 | 138 |
| Type S Lime (g) | 9.2 | 9.2 |
| Silica Sand (g) | 1732 | 1776 |
| Water (g) | 325.22 | 325.22 |
| w/cm | 0.35 | 0.35 |
| 3-day (psi) | 8605 | 8475 |
| 7-day (psi) | 9755 | 9742 |
| 28-day (psi) | 11990 | 11415 |

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for manufacturing a plurality of different cement-SCM blends, comprising:
classifying an initial supplementary cementitious material (SCM) using an air classifier to produce fine SCM and coarse SCM;
blending the fine SCM but not the coarse SCM with a first hydraulic cement to produce a first cement-SCM blend;
grinding the coarse SCM to form ground SCM; and
blending the ground SCM but not the fine SCM with a second hydraulic cement to produce a second cement-SCM blend.

2. The method of claim 1, further comprising grinding one or more SCMs to form the initial SCM prior to classifying to form the fine SCM and the coarse SCM.

3. The method of claim 1, wherein the initial SCM is selected from the group consisting of coal ash, metallurgical slag, biomass ash, post-consumer glass, ground granulated blast furnace slag, steel slag, fly ash, volcanic ash, natural pozzolans, calcined shale, metakaolin, quarry fines, trass, ground limestone, ground quartz, ground siliceous materials, precipitated $CaCO_3$, and precipitated $MgCO_3$.

4. The method of claim 1, further comprising grinding the fine SCM prior to blending with the first hydraulic cement.

5. The method of claim 1, wherein the fine SCM is finer than the first hydraulic cement.

6. The method of claim 1, wherein the ground SCM is finer than the second hydraulic cement.

7. The method of claim 1, wherein the coarse SCM is blended with the second hydraulic cement without intergrinding.

8. The method of claim 1, wherein the coarse SCM is ground and blended with the second hydraulic cement by intergrinding.

9. The method of claim 1, wherein the ground SCM is coarser than the second hydraulic cement.

10. The method of claim 1, further comprising intergrinding the coarse SCM with another SCM to form the ground SCM.

11. The method of claim 1, further comprising blending a portion of the fine SCM with the second cement-SCM blend to form a third cement-SCM blend.

12. The method of claim 1, further comprising blending a portion of the ground SCM with the first cement-SCM blend to form a fourth cement-SCM blend.

13. A method for manufacturing a plurality of different cement-SCM blends, comprising:
classifying fly ash using an air classifier to produce fine fly ash and coarse fly ash;
blending the fine fly ash but not the coarse fly ash with a first hydraulic cement to produce a first cement-SCM blend;
grinding the coarse fly ash to form ground fly ash; and
blending the ground fly ash but not the fine fly ash with a second hydraulic cement to produce a second cement-SCM blend.

14. The method of claim 13, further comprising grinding the fine fly ash prior to blending with the hydraulic cement.

15. The method of claim 13, wherein the coarse fly ash is blended with the second hydraulic cement without intergrinding.

16. The method of claim 13, wherein the coarse fly ash is ground and blended with the second hydraulic cement by intergrinding.

17. The method of claim 13, further comprising blending a portion of the fine fly ash with the second cement-SCM blend to form a third cement-SCM blend.

18. The method of claim 13, further comprising blending a portion of the ground fly ash with the first cement-SCM blend to form a fourth cement-SCM blend.

19. A method for manufacturing a plurality of different cement-SCM blends, comprising:
classifying an initial supplementary cementitious material (SCM) using an air classifier to produce fine SCM and coarse SCM, wherein the initial SCM is selected from the group consisting of coal ash, metallurgical slag, biomass ash, post-consumer glass, ground granulated blast furnace slag, steel slag, fly ash, volcanic ash, natural pozzolans, calcined shale, metakaolin, quarry fines, trass, ground limestone, ground quartz, ground siliceous materials, precipitated $CaCO_3$, and precipitated $MgCO_3$;

blending the fine SCM but not the coarse SCM with a first Portland cement to produce a first cement-SCM blend;

grinding the coarse SCM to form ground SCM; and blending the ground SCM but not the fine SCM with a second Portland cement to produce a second cement-SCM blend.

20. The method of claim 19, further comprising:

blending a portion of the fine SCM with the second cement-SCM blend to form a third cement-SCM blend; or blending a portion of the ground SCM with the first cement-SCM blend to form a fourth cement-SCM blend.

\* \* \* \* \*